(12) United States Patent
Seiler et al.

(10) Patent No.: US 10,282,808 B2
(45) Date of Patent: May 7, 2019

(54) HIERARCHICAL LOSSLESS COMPRESSION AND NULL DATA SUPPORT

(71) Applicant: Intel Corporation, Santa Clara, CA (US)

(72) Inventors: Larry Seiler, Boylston, MA (US); Prasoonkumar Surti, Folsom, CA (US); Aditya Navale, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 15/167,987

(22) Filed: May 27, 2016

(65) Prior Publication Data

US 2017/0345122 A1 Nov. 30, 2017

(51) Int. Cl.
*G06T 1/20* (2006.01)
*G06F 3/06* (2006.01)
*G06F 12/1009* (2016.01)
*G06T 1/60* (2006.01)

(52) U.S. Cl.
CPC .............. *G06T 1/20* (2013.01); *G06F 3/0611* (2013.01); *G06F 3/0644* (2013.01); *G06F 3/0659* (2013.01); *G06F 3/0688* (2013.01); *G06F 12/1009* (2013.01); *G06T 1/60* (2013.01); *G06F 2212/1021* (2013.01); *G06F 2212/1024* (2013.01); *G06F 2212/302* (2013.01); *G06F 2212/657* (2013.01)

(58) Field of Classification Search
CPC . G06T 1/20; G06T 1/60; G06F 3/0688; G06F 3/0611; G06F 12/1009; G06F 3/0659; G06F 3/0644; G06F 2212/302; G06F 2212/1021; G06F 2212/1024; G06F 2212/657

See application file for complete search history.

(56) References Cited

U.S. PATENT DOCUMENTS

| | | | | |
|---|---|---|---|---|
| 2010/0125694 A1* | 5/2010 | Choi | ................... | G06F 12/0246 711/1 |
| 2010/0138614 A1* | 6/2010 | Glasco | ................ | G06F 12/0875 711/144 |
| 2010/0146246 A1* | 6/2010 | Frank | .................. | G06F 9/30032 712/220 |
| 2012/0059973 A1* | 3/2012 | Adams | ................ | G06F 12/1009 711/6 |
| 2014/0279941 A1* | 9/2014 | Atkisson | ........... | G06F 17/30371 707/690 |
| 2014/0368523 A1* | 12/2014 | Patel | ........................ | G06T 1/60 345/557 |

(Continued)

*Primary Examiner* — William A Beutel
(74) *Attorney, Agent, or Firm* — Schiff Hardin LLP

(57) ABSTRACT

Described herein are computer graphics technologies to facilitate effective and efficient memory handling for blocks of memory including texture maps. More particularly, one or more implementations described herein facilitates hierarchical lossless compression of memory with null data support for memory resources, including texture maps. More particularly still, one or more implementations described herein facilitates the use of meta-data for lossless compression and the support of null encodings for Tiled Resources. This technology also permits use of the fast-clear compression method, where meta-data specifies that the entire access should return some specified clear value.

19 Claims, 21 Drawing Sheets

(56) References Cited

U.S. PATENT DOCUMENTS

| | | | |
|---|---|---|---|
| 2015/0089146 A1* | 3/2015 | Gotwalt | G06F 12/1009 711/133 |
| 2015/0134909 A1* | 5/2015 | Yochai | G06F 3/0611 711/118 |
| 2015/0262385 A1* | 9/2015 | Satoh | G06T 11/001 345/582 |

* cited by examiner

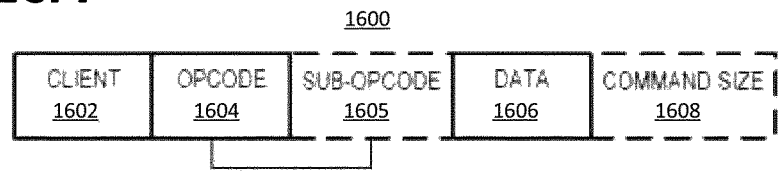
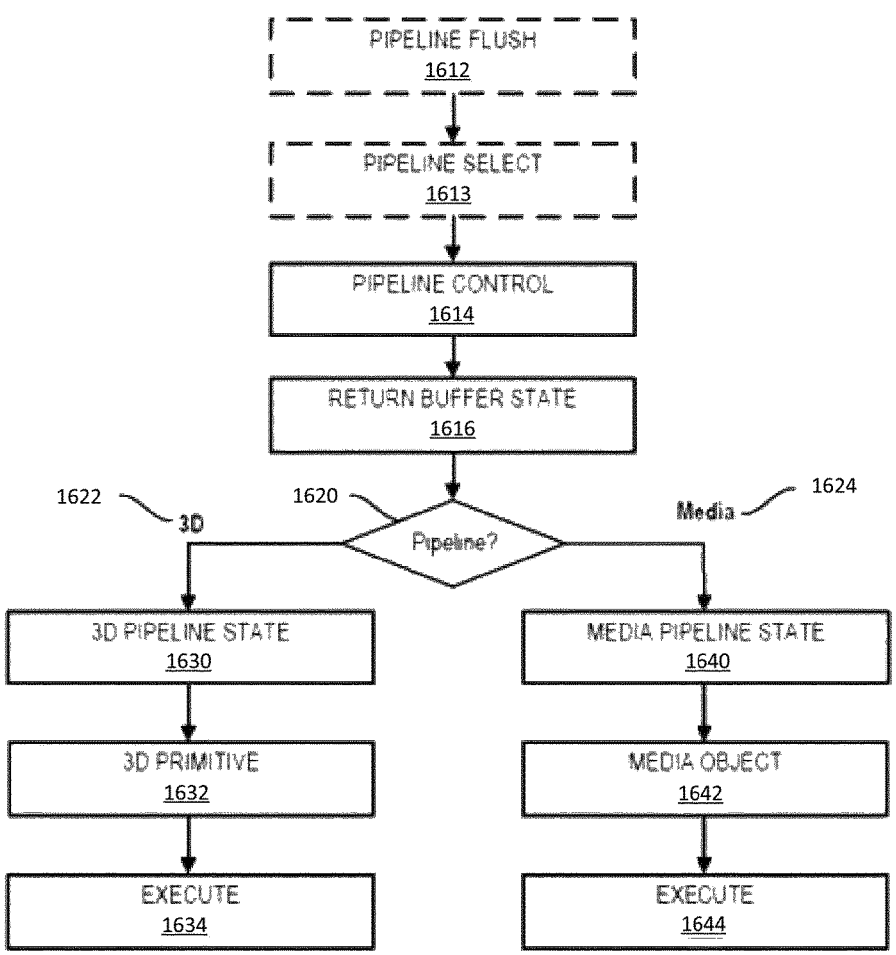

HIERARCHICAL LOSSLESS COMPRESSION AND NULL DATA SUPPORT

BACKGROUND

In the context of three-dimensional (3D) computer graphics (especially with video games, simulations, or the like), real-time graphics processing is important. It is common for computer-graphics (CG) systems to generate 25-60 frames per second (fps). CG systems must generate a two-dimensional (2 D) view of a computer-generated 3D world.

Consequently, many known techniques exist to enhance the speed and efficiency of a CG system. Many of these approaches are directed towards effective and efficient management of the memory of a graphics processing unit (GPU) of a CG system. A key element of efficiency is to reduce the amount of memory required, which reduces the cost of the memory. Another key element of efficiency is reducing the number of memory accesses required, which reduces both the cost of the memory and the amount of power required to access memory.

A common approach is to compress the data stored in memory to reduce the bandwidth (BW) requirements. Many common memory compression methods are lossless, meaning that decompression exactly restores the compressed data. These methods use additional bits per block of memory, referred to as meta-data, to specify the degree of compression. The meta-data is stored in a memory array typically referred to as a control plane. Typically, the meta-data is defined to support a single block size and a single compression method.

Another approach to enhance the speed and efficiency of a CG system involves reducing the total data stored in memory. Some CG applications use large arrays of data, out of which only a small region is required for rendering any particular frame. The memory array may be many times larger than the amount used on a given frame. This occurs in cases such as texture map that store highly detailed image data for which only a small amount is used in a given frame. It also occurs for cases such as arrays or more complex data structures representing objects to render, where only a small amount of the object data is needed in a single frame.

A known solution on CPUs is to use virtual address translation with page faulting. This solution depends on being able to suspend processing while waiting for data to be loaded into memory in response to the page fault. This cannot be used for real time graphics applications because the time required to respond to a page fault is a large fraction of the time required to render a single frame. Therefore, for real time graphics the required data must be predicted and loaded in advance, instead of loading it only when accessed.

A known solution to this problem for real time graphics is a technique referred to as Tiled Resources. The key idea is to divide the memory resource into an array of tiles of some moderate size, e.g. 64 KB. The tiles represent a linear sequence of memory for a data structure, a 2 D region for a 2 D array, or a 3D region for a volumetric array. The application then selects the tiles required to render a given frame and maps them to memory using a new type of virtual address translation table that is controlled by the application. As a result, a small "tile pool" stores the tiles required out of the larger memory array, thus dramatically reducing the amount of memory required to access the memory resource.

Tiles that are not mapped to memory are typically referred to as "null" tiles. The application-controlled address translation table specifies that such tiles are null instead of providing a translation address. Unlike traditional virtual addressing, accessing a null tile does not cause a fault or delay. Applications may detect these null accesses when reading from memory and then compute some alternate result. If that is not done, reading from a null tile returns a constant value, typically zeros, and writes to a null tile are ignored. This is necessary since there is no actual memory backing up an access to a null tile. Null access semantics need to be enforced both with and without the use of meta-data bits for compression.

BRIEF DESCRIPTION OF THE DRAWINGS

FIG. 16A is a block diagram illustrating a graphics processor command format according to an embodiment and FIG. 16B is a block diagram illustrating a graphics processor command sequence according to an embodiment.

The Detailed Description references the accompanying figures. In the figures, the left-most digit(s) of a reference number identifies the figure in which the reference number first appears. The same numbers are used throughout the drawings to references like features and components.

DETAILED DESCRIPTION

Overview

Figure 1:
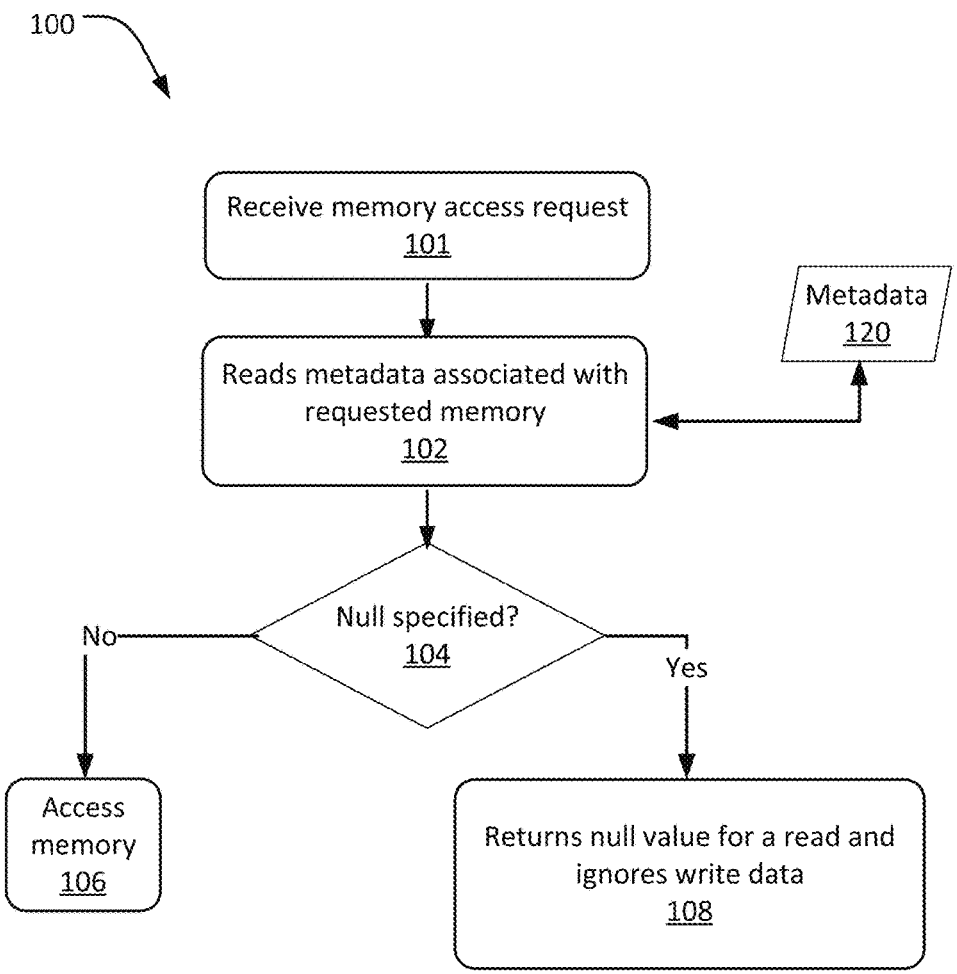
FIG. 1 illustrates a flowchart of a methodological implementation in accordance with implementations as described herein to use meta-data to detect null accesses, in accordance with implementations as described herein.

Described herein are computer graphics technologies to facilitate effective and efficient memory handling for blocks of memory including texture maps. More particularly, one or more implementations described herein facilitates hierarchical lossless compression of memory with null data support for memory resources, including texture maps. More particularly still, one or more implementations described herein facilitates the use of meta-data for lossless compression and the support of null encodings for Tiled Resources. This technology also permits use of the fast-clear compression method, where meta-data specifies that the entire access should return some specified clear value.

The technologies described herein include a hierarchical meta-data encoding format that enables a backwards-compatible increase in the number of memory units (MUs) that are compressed without changing either the way the meta-data is stored in memory or the codes used for compressing subsets of the MUs. With the technologies described herein, a single meta-data format is used that can be extended to represent each compressible unit size. That format is used to compress groups of 2 units, four units, eight units (and so forth) for whatever maximum compression ratio that is specified for a given product, as well as allowing efficient implementation of null tile semantics.

This approach enables the encoding (i.e., indication) for 2:1 and 4:n compression of MUs. It also enables support for larger compression blocks, while retaining the existing compression block sizes and methods. As a result, a single meta-data encoding method supports a wide range of variable block sizes. This approach provides a balance between maximal compression and minimal wasted accesses when only a portion of the maximum size compression block needs to be accessed.

In addition, the technologies described herein include at least three related ways to support the null encoding used by tiled resources. One of these null-encoding support approaches involves detecting that a tile is null and avoiding reads and writes for that tile. Another approach involves the use of a meta-data encoding that identifies null tiles. Still another approach is used independently of the meta-data table.

By definition, memory locations in a null tile return a default value, such as zero, on reads. Writes to addresses in a null tile are ignored. This means that a write-back cache cannot allocate a cache line without checking whether the memory address is null, since otherwise it might store data that could be accessed on a following read, when the following read should return the null value, typically all zeros. This also means that meta-data cannot be set to a fast-clear compression state without checking whether the address is null. The existing solution is to perform a memory read, which costs bandwidth.

Tiled Resources

The demand for using more data in graphics applications continues to grow rapidly. Such data is used for example to represent large data structures that describe the objects to render, large 2 D arrays of texture data, and also large 3D volumetric arrays of data. Example usages of 3D textures include representing fog, waves, fire, clouds, or solid objects that have internal structure. Example usages of 2 D textures include bump mapping, which simulate the appearance of surface bumps without actually modifying the geometry of the object; light maps, which give the appearance of smooth diffuse lighting; displacement mapping, in which textures are used actually to move the surface; and solid textures that give consistent textures of all surfaces of an object regardless of distortions of the surface parameter space. Individual elements of 2 D and 3D texture arrays are called "texels".

Texture maps and other graphics data structures may be very large, with only a fraction of the data required to render any given frame. Typically, the GPU loads the texture data into memory before it is used by a graphics application. It is desirable to reduce the amount of data to be loaded for two reasons. First, the memory available to the graphics application is typically limited, so it is necessary to budget how much data can be used. Second, since the end-user must wait for the texture data to be completely loaded into memory before starting the application (e.g., playing a video game), it is desirable to reduce this time as much as possible by loading less data.

One approach to reducing the memory requirements for loading textures and other data structures is called Tiled Resources. Normally the application must load an entire memory resource to use any of it. With Tiled Resources, the application can easily load subsets of the data and can easily change the subset that is loaded, as requirements for rendering different frames changes the set of data that is needed.

Tiled resources enable this by the data subdividing the memory resource into tiles of some moderate size, e.g. 64 KB. The application then selects which tiles to load into memory. For 1 D, 2 D, and 3D arrays of data, individual tiles typically represent compact, aligned 1 D, 2 D, or 3D blocks of data within the memory resource. A translation table maps Tiled Resource addresses into either process virtual addresses or physical addresses, depending whether graphics application memory is allocated virtually or physically. This translation means that sequential addresses within the Tiled Resource can be mapped to a set of tiles that are packed arbitrarily into memory. A typical name for memory used to store tiles that the application chooses to map to memory is a "tile pool".

Tiles that the application does not choose to map to memory are referred to as "null tiles". Memory resources are saved because no physical memory is allocated for these missing tiles. Since there is no memory backing up the null tiles, writes to them are ignored and reads return a default value, such as all zeros. In some cases, graphics applications may be able to detect an access to a null tile and compute a "fallback" value.

Null Data Processing

One problem with the conventional handling of null tiles is that they can cause false data to be stored in local caches. For example, if a write to a null tile is stored in a local cache, that write will be ignored once the cache line is flushed, but in the meantime, a read of the cache would return non-zero data. With conventional approaches, this is avoided by knowing at the time of the cache write that the data address is null, which in turn requires accessing the data, at least to the level of detecting whether the virtual address translates to a null. This method requires disallowing "allocate on write", which allows a cacheline to be allocated to store write data without reading from memory. Allocate on write is an important optimization for many graphics applications, so this is not a desirable solution. The technologies described herein address this problem.

Some implementations use meta-data with a null encoding in the meta-data in order to solve the null semantics problem. Using this method, accessing the meta-data is sufficient to determine whether the data being access is null or not.

FIG. 1 shows an example process 100 illustrating the technology as described herein using meta-data to detect null accesses. The example process 100 may be implemented as part of a computer graphics (CG) system. The process 100 is implemented to solve a problem involving the conventional handling of null tiles is that they can cause false data to be stored in local caches.

At block 101, the CG system receives an access request (e.g., read or write) to a memory resource (e.g., a tiled resource) that is associated with metadata 120 that supports null data.

At block 102, CG system reads the associated metadata 120 before an access of the memory resource.

At block 104, the CG system determines if the encoding specifies null. If not, then the process proceeds to block 106. At that block, the CG performs the requested access. Thus, the system proceeds as it normally would with a read/write of/to the memory resource.

Block 108 is where the process 100 goes to if the metadata encoding returns a null. At block 108, the CG system ignores any data that is to be written to memory or returns a null value for a read request. Also, at 108, the CG system returns null value for a read. There is no need first to read the data to discover whether it should be ignored as was necessary with conventional approaches.

This process depends on the meta-data being correctly set to indicate null for data that is part of a null tile. This may be done by driver software initializing the encodings to null when a Tiled Resource is created, setting them to non-null when a tile is mapped to memory, and setting the encodings to null when a tile is unmapped from memory.

If there is no meta-data associated with a Tiled Resource, or if the meta-data does not include a null encoding, (like as it is with conventional approaches), then the null semantics problem can be addressed via a new approach called "null probing" herein. Null probing provides a way to detect null accesses without the cost in latency and memory bandwidth of performing a read access.

Figure 2:
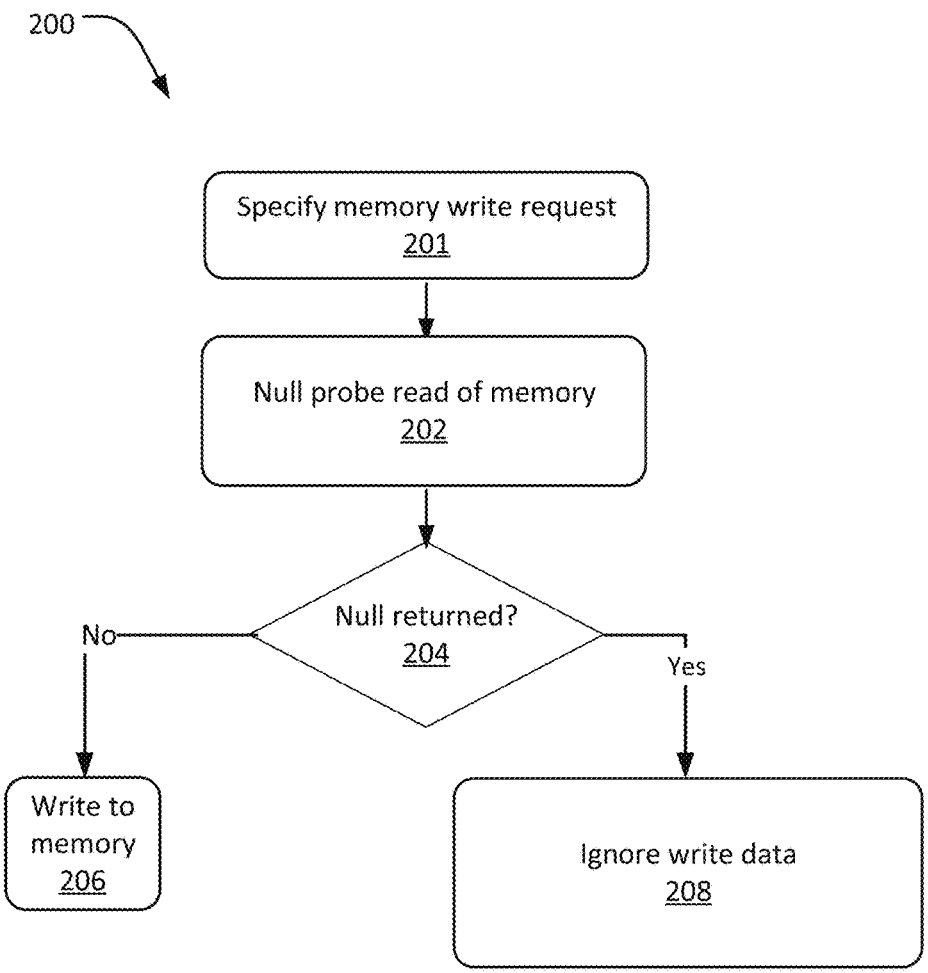
FIG. 2 illustrates a flowchart of a methodological implementation that uses null probing to efficiently detect null data accesses, in accordance with implementations as described herein.

FIG. 2 shows an example process 200 illustrating the technology as described herein using null probing to efficiently detect null data accesses. The example process 200 may be implemented as part of a computer graphics (CG) system. The process 200 is implemented to accomplish null probing in accordance with the description herein.

At block 201, the CG system receives a memory write request to a tiled resource that is not associated with metadata that supports null data.

At block 102, CG system performs a special kind of read called herein a null probe. This access does not return data, but only returns whether the location to be written is part of a null tile. The information about whether a tile is null is contained in the translation table that converts a tiled resource address into a memory address. As a result, it isn't necessary to actually access memory or even any data caches and also does not require a virtual to physical address translation. Because of this, the null probe read is far more efficient than reading data from memory. Additionally, it is possible to cache the null probe result, so that the null probe doesn't need to be repeated for subsequent accesses to the same tile.

At block 204, the CG system determines if the null probe read returned a null. If not, then the process proceeds to block 206. At that block, the CG performs the requested write access, or else stores the write data in a cache for later writing to memory. Thus, the system proceeds as it normally would with a read/write of/to the memory resource of texture space.

Block 208 is where the process 200 goes to if the metadata encoding returns a null. At block 208, the CG system ignores any data that is to be written to memory. There is no need first to read the data to discover whether it should be ignored as was necessary with conventional approaches. The write data may be ignored, or a cacheline may be allocated that is marked as being part of a null tile.

Another problem with conventional approaches to null data occurs when a fast clear is performed. A fast clear is an operation where a region of memory (typically the entire resource) is cleared to a value that is stored in a per-resource data structure. With the technologies described herein, when there are no nulls, the clear can be performed simply by setting the meta-data to the clear encoding. Then the per-resource fast clear value is used whenever a cleared location in the memory resource is accessed. This does not work in the presence of null data, since fast-clear of a null tile must not result in reading the fast-clear value. Therefore, it is not sufficient to simply set the meta-data to fast-clear—it is necessary to also determine whether the location is part of a null tile.

Figure 3:
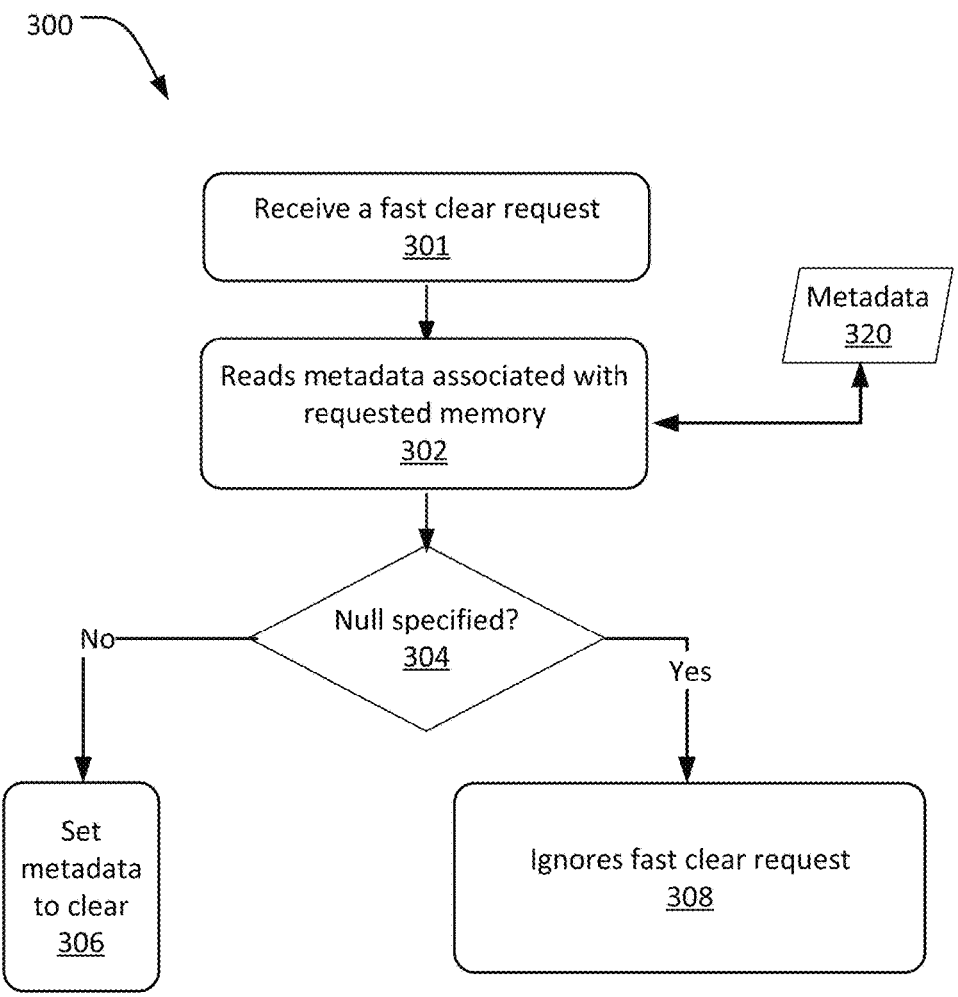
FIG. 3 illustrates a flowchart of a methodological implementation in that correctly processes null data during a fast clear operation, in accordance with implementations as described herein.

FIG. 3 shows an example process 300 illustrating the technology described herein related to processing null data during a fast clear operation. The example process 300 may be implemented as part of a computer graphics (CG) system. The process 300 is implemented to solve a problem involving the conventional handling of fast clear when there is null data.

At block 301, the CG system receives a fast clear request for a memory resource (e.g., a tiled resource) of texture space that is associated with a metadata 320 that supports null data.

At block 302, CG system reads the associated metadata 320 before acting on the fast clear request.

At block 304, the CG system determines if the encoding specifies null. If not, then the process proceeds to block 306. At that block, the CG sets the associated metadata 320 to an encoding that specifies clear for the memory resource.

Block 308 is where the process 300 goes to if the metadata encoding returns a null. At block 308, the CG system ignores the fast clear request. There is no need first to read the data to discover whether it should be ignored as is necessary with conventional approaches.

Basic Lossless Compression with Null Data Support

At least one implementation of the technology described herein utilizes state-indicating meta-data associated with a set of memory units (MUs). The meta-data specifies the state of the data in those MUs. With at least one implementation, the state-indicating meta-data is formatted and encoded to be backwardly compatible with previous or lesser formats, while allowing compression using larger block sizes by combining the meta-data bits used for the smaller blocks of the previous format. Thus, the meta-data is hierarchical, as is explained in detail below.

Consider a compression method that uses 2-bits of meta-data per block, where each block is divided into two memory units or MUs, The 2-bit meta-data value enables encoding four states. One example usage is to encode states for uncompressed (stores data in both MUs), 2:1 compressed (stores data in one MU), a clear color (stores no data in the MUs), and an escape code.

The escape code may be used to specify the Null state, using the example method described in FIG. 3. Note that an MU may be size that convenient size, e.g. 64-bytes. The size of the MU is selected so that it is more bandwidth efficient to access a single MU (for 2:1 compression) in place of two MUs (for uncompressed).

The clear color is typically stored in a header block that is common to the entire memory resource being compressed. This header block may store other information about the memory resource and the compression format. As a result, this state can be combined into a single header block address for the resource and does not need to be separately managed.

Figure 4:
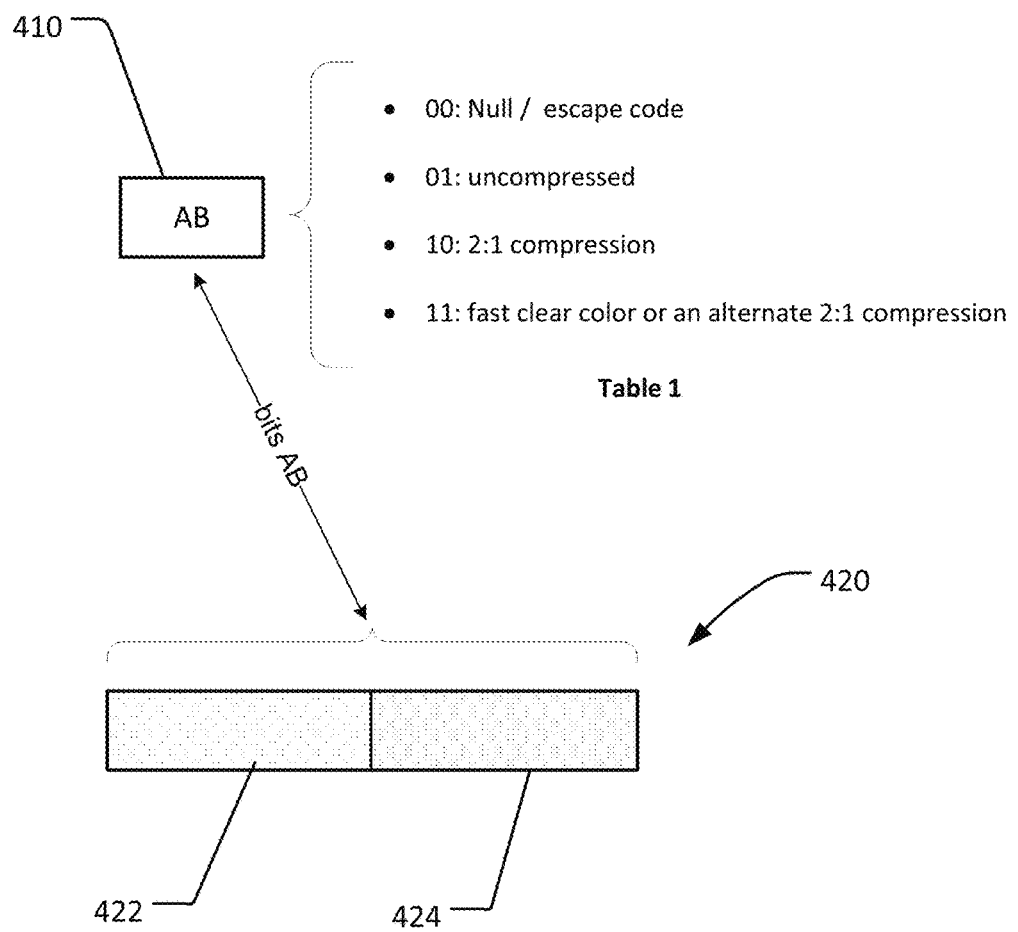
FIG. 4 illustrates a metadata format that includes an escape code to allow specifying the presence of null data, which may be employed with an implementation in accordance with implementations as described herein.

FIG. 4 depicts an example metadata 410 that includes an escape code to allow specifying the presence of null data. Metadata 410 applies to a set 420 of a 2-MU compression block, where 422 and 424 are the individual MUs. This figure shows them as being in adjacent memory locations, but that is not required. The metadata 410 has two bits and specifies compression for the 2-MU block 420.

Typically, the size of the memory block is equivalent to the size of one cache line (e.g., 64 bytes). However, it can be other sizes (e.g. 32 bytes) in other implementations.

The two bits of the example meta-data 410 for the set 420 encodes a combination of four states. When used alone the bits encode four alternatives, e.g. an uncompressed state, a 2:1 compression state, a fast clear color state, and null. Other combinations may be used in other implementations of this method, e.g. replacing the fast clear encoding with a second kind of 2:1 compression. The uncompressed state is when each of the memory blocks (e.g., 420 and 424) contained an uncompressed MU (e.g., MU0 and MU1). A 2:1 compressed state is when two MUs are compressed and located in one of the two memory blocks of the set 420, for example block 422.

A fast clear color state is when the specified memory block(s) (e.g., 422 and 424) are designated to be a "clear" color. The clear color is effectively a default color. For example, this might be useful for a solid color background or foreground of a 3D scene. Setting the metadata to the state of clear color is bandwidth efficient because it eliminates the need to write a color to the texture space. Clearing a large area of a resource to a single color is a common operation.

A null state is when the texture space associated with the memory block(s) (e.g., 422 and 424) is part of an unmapped Tiled Resource tile, so that accesses to those memory locations should obey null semantics. This includes ignoring writes and returning a null value, typically all zeros, on reads.

As shown in FIG. 4 and Table 1 below, the example metadata link 410 described above may be encoded in this manner. The Null Encoding may alternately be used as an escape code when implementing hierarchical compression for a larger meta-data size.

TABLE 1

00 Null Encoding (or escape code)
01: uncompressed (A and B may be accessed separately)
10: 2:1 compression (AB compresses to one MU)
11: fast clear color or an alternate 2:1 compression The fast clear encoding may also be generated during normal rendering. At the rendering time, there is an optimization to reduce bandwidth by detecting that the entire compression block stores the clear value and the compression block is not null. In that case, the meta-data can be set to the clear color encoding, even though a fast clear operation is not being performed. Bandwidth is saved both because no data needs to be written out as a result of the rendering operation that discovers the clear value in the block, and because no data needs to be read the next time the block is rendered. As for normal fast-clear, this optimization can only be performed if the meta-data is not already at the null encoding.

Hierarchal Lossless Compression with Null Data Support

One or more implementations of the technology described herein further provides a mechanism to extend this 2-bit 2-MU compression approach (discussed above) into a 4-bit 4-MU compression approach that still supports the 2-MU compression modes. That is, it the 4-bit 4-MU compression approach is backward compatible with the 2-bit 2-MU compression approach.

For this discussion of the 4-bit 4-MU compression approach, presume that memory is organized into sets of 4 MUs. Note that the 2-MU pairs above need not be contiguous in memory, and neither do the 4-MU blocks for 4-MU hierarchical compression. Here, the null state encoding of each 2-bit part of the 4-bit metadata is redefined as an escape code that select a 4-MU compression method when either one of the 2-bit meta-data values in the 4-MU 4-bit meta-data value indicate the escape code.

In this 4-bit 4-MU compression approach, the null encoding is then defined as the state where both 2-bit values in the 4-bit meta-data specify the escape code. This increases the granularity of specifying null tiles from 2 MU to 4 MU, so that in a typical case of 64B MU, the null encoding affects 256B blocks. Tiled Resource tiles are currently defined as 64 KB blocks. Even if they were reduced to the standard 4 KB page size, that would still cover 256 64B MU. So, the only constraint that this larger null encoded region requires is that the four MUs must be within the same Tiled Resource tile.

Using a single 4-bit code to specify a 4-MU null region does not cause a problem for specifying null tiles, since null tiles are typically large compared to compression blocks. E.g. a 4-MU compression block might be 256-bytes, whereas Tiled Resource tiles are currently typically 64 KB. Even if they were 4 KB, that would allow a compression block size of 64-byte MUs. For this, all of the MUs in the compression block falls within the same Tiled Resource tile.

As a result of redefining the meaning of the escape code in this way, the 4-bit hierarchical meta-data value still represents the three non-escape cases for each of the pairs of non-hierarchical MUs, when neither of them specifies the escape code. That is a total of 3*3 or 9 out of 16 encodings possible with a 4-bit meta-data value. Another encoding represents the null state, when both bit-pairs specify the escape code. This leave 6 unused encodings, for the cases where one or the other of the 2-bit meta-data values specifies the escape code. These six addition codes may be used to specify 4:n compression cases, where compression occurs across all four MUs.

Figure 5:
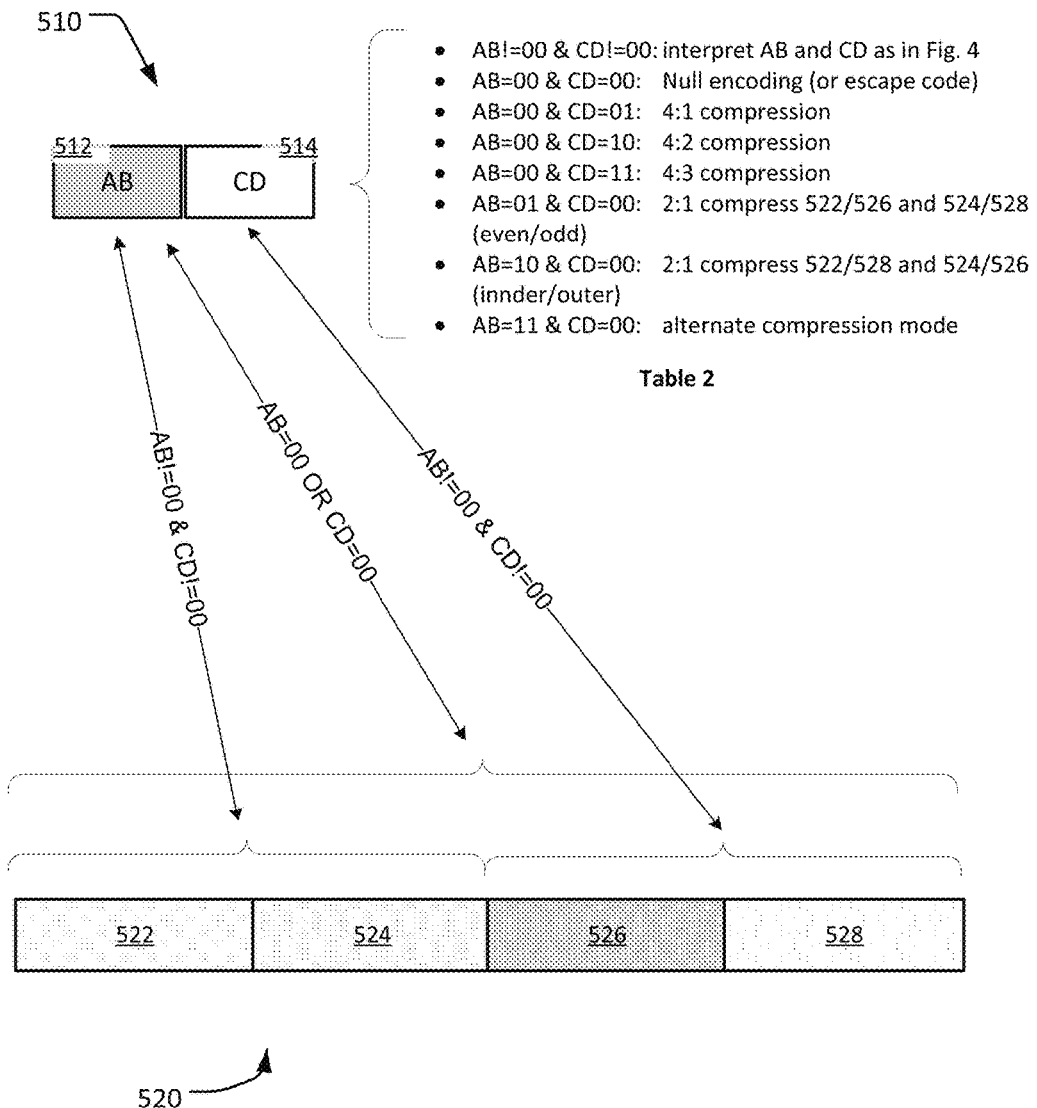
FIG. 5 illustrates a metadata format that using a pair of 2-bit metadata leaf nodes to produce a hierarchical 4-bit meta-data value, which may be employed in an implementation in accordance with implementations as described herein.

FIG. 5 depicts an example of using a pair of 2-bit metadata leaf nodes 512 and 514 to produce a hierarchical 4-bit meta-data value 510, which compresses a set of four MU 520. The individual memory units (522-528) are shown as being adjacent but that is just for illustration purposes. They do not need to be adjacent. Rather, they should fall within the same Tiled Resource tile, if Tiled Resources is being used. This implementation may also be used to provide hierarchical compression if a normal resource is being compressed, so that a Null Encoding is not required.

As shown in FIG. 5 and in Table 2 below, the 4-bit meta-data 510 may be encoded in this manner. The Null Encoding may alternately be used as an escape code when implementing hierarchical compression for a larger meta-data size.

TABLE 2

| | |
|---|---|
| AB! = 00 & CD! = 00: | interpret AB and CD as in Table 1 |
| AB = 00 & CD = 00: | Null encoding (or escape code) |
| AB = 00 & CD = 01: | 4:1 compression |
| AB = 00 & CD = 10: | 4:2 compression |
| AB = 00 & CD = 11: | 4:3 compression |
| AB = 01 & CD = 00: | 2:1 compress 522/526 and 524/528 (even/odd) |
| AB = 10 & CD = 00: | 2:1 compress 522/528 and 524/526 (innder/outer) |
| AB = 11 & CD = 00: | alternate compression mode |

This is a hierarchical encoding because the 4-bit meta-data is interpreted as two 2-bit meta-data values if neither one specifies the Null Encoding from Table 1, which is here treated as an escape code. The Null Encoding is now specified by using two escape codes. This allows encodings where only one 2-bit value specifies the escape code to represent compression methods on the 4-MU group representing the pair of 2-MU groups compressed by bits AB (512) and CD (514).

With the 4:1 compression state, all four MUs are compressed to a single MU value, which for example may be stored in block 522. Reading this compression format is not a disadvantage relative to leaving the data uncompressed, even if only one MU is required.

With the 4:2 compression state, all four MUs are compressed to a pair of MU values, which for example may be stored in blocks 522 and 524. Reading this compression format costs an extra MU access if only one of the MUs from block 520 are required. As a result, it is better to use the 2-bit encodings to separately use 2:1 compression on blocks 522 &524 and on blocks 526 & 528, if possible. However, in some implementations the memory subsystem may access pairs of MU, e.g. if the MU is 32B and the memory subsystem accesses 64B. In that case this format does not cause any extra accesses. Compressors may or may not use that format, possibly based on a bit set in the per-resource header block.

With the 4:3 compression state, all four MUs are compressed to three MU values, which for example may be stored in blocks 522, 524, and 526. Reading this compression format costs extra accesses if only one or two MUs are needed from block 520 are required, if possible. As a result, it is better to use the 2-bit encodings to separately use a 2:1 compression and a 2:2 compression on the 2-MU pairs. However, in some implementations the memory subsystem may access pairs of MU, e.g. if the MU is 32B and the memory subsystem accesses 64B. In that case this format does not cause any extra accesses if data is needed from both block pairs. Compressors may or may not use that format, possibly based on a bit set in the per-resource header block.

Two additional forms of compression are described in the table. These perform 2:1 compression on pairs of MUs that are not part of the same 2-MU pair. So while specifying AB=CD=10 performs 2:1 compression on blocks 522/524 and 526/528, these additional 4:2 compression modes compress the pairs 522/526 and 524/528 in one case (which may be called even/odd 2:2 compression) and 522/528 and 524/526 in the other case (which may be called inner/outer 2:1 compression). These achieve the same overall compression as 4:2, but without the extra read access cost if only one MU is needed. As a result, they should be used in place of 4:2 compression when possible.

A number of other 4-MU compression methods could be encoded in the hierarchical 4-bit meta-data format. For example, codes could be used for an alternate form of 4:1 compression, for a clear encoding if that method isn't available using 2-bit non-hierarchical meta-data, or for a constant value such as all zeros. Nor is it necessary to use 0000 as a Null encoding if the memory resource is not a Tiled Resource. The seven 4-MU compression methods selected are typically the ones found to be most effective for a given memory resource. Bits in the header block may encode options such as additional clear colors, the set of compression modes supported, and the ways that memory units are combined into pairs and groups of four. This allows selecting the most optimal compression options on a per-resource basis. It also allows the state to be combined into a single header block address for the resource so that it does not need to be separately managed.

Larger Compression Block Sizes

The meta-data format scheme discussed above (e.g., with FIGS. 4 and 5) may be extended to larger levels of hierarchy. For example, it can be extended to cover 8-MU compression blocks, 16-MU compression blocks, etc. by continuing the system of specifying, for example, an all-zeros escape code for each of a pair of N-MU compression blocks. This allows each smaller hierarchical level to specify all of its compression codes, while providing an additional $2*(2^N-1)$ encodings for compressing a pair of N-MU blocks, plus one additional code to select either null semantics or to allow an escape to an even larger block size. For 8-bit meta-data that compresses 8-MUs, this allows specifying 30 additional 8:n compression modes.

These larger compression block sizes are useful when access patterns cover most of all of a larger block size, so that the larger compression granularity doesn't result in very many wasted accesses. For example, an algorithm that accesses data in large regions benefits from a large compression block size, whereas an algorithm that accesses small regions can perform worse if the compression block size is too large. One or more implementations of the technology described herein permit the block size to be programmatically or adaptively selected from 2-MU up the maximum supported size. As a result, implementing a large block size need not ever reduce performance using this method.

Larger block sizes are also useful when parts of the system have a multi-MU access granularity. For example, the memory may be accessed in 64B units. In that case, if the MU is 32B, then memory bandwidth is wasted each time the compressed data is not a multiple of 64B. Additionally, some caches may have a 128B line size, and portions of the system could use a 32B memory granularity. In that case, if the MU is 32B, then cache memory is wasted each time the compressed data is not a multiple of 128B.

Performing 8:1 or 16:1 compression on arbitrary data is likely to be quite expensive to implement, as well as increasing overhead if only a portion of the data is required. An alternative is to perform hierarchical compression on 4-MU or 8-MU units, with the results stored compacted within the 8-MU or 16-MU block. This results in less wasted memory bandwidth and cache usage than if the results of 4-MU compression are each stored in their own 4-MU block. Therefore, large compression blocks can be useful even in the absence of algorithms for compressing at rates higher than 4:1.

Figure 6:
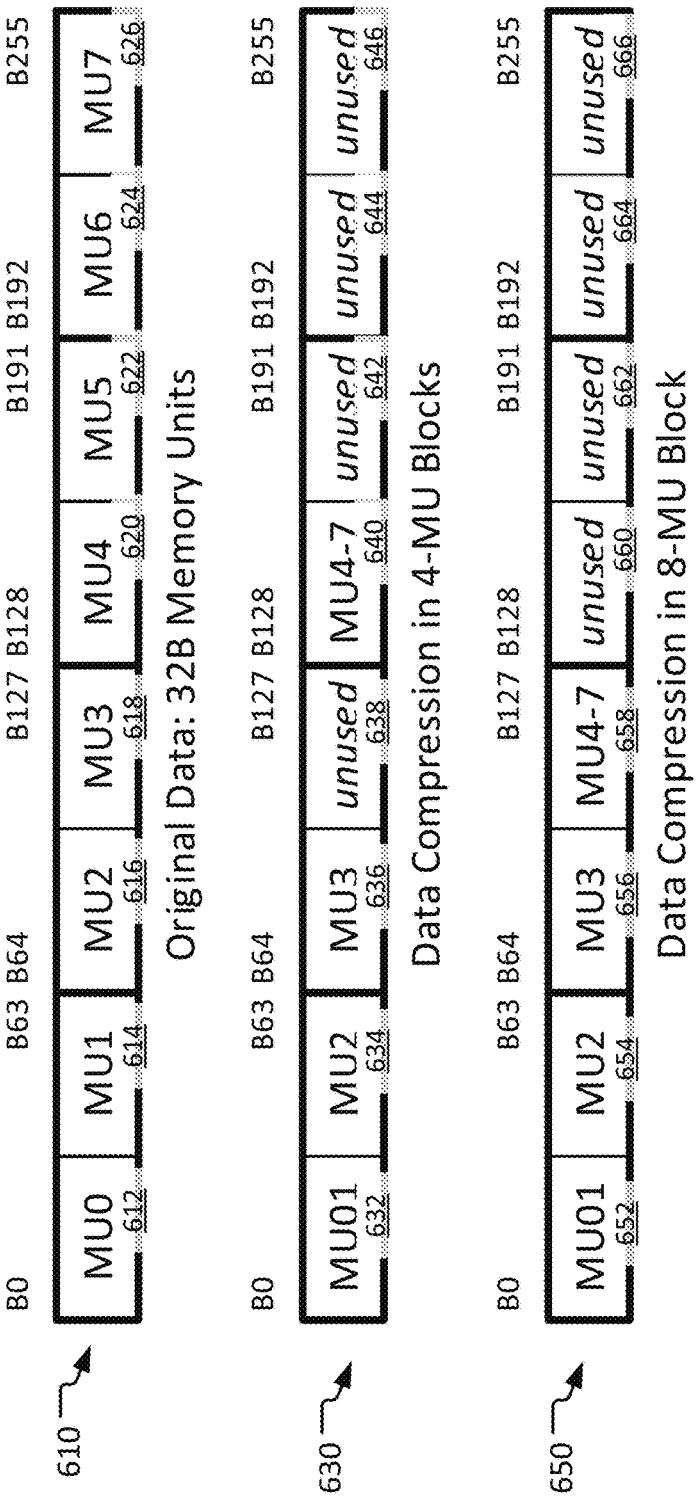
FIG. 6 illustrates example scenarios of compacting the results of separately compressing a pair of compression blocks, in accordance with implementations as described herein.

FIG. 6 illustrates three cases for compression using 8-MUs by compacting the results of separately compressing the two 4-MU blocks. For this example the MUs are each 32B. The cases are uncompressed data (610), an example of using 4:1 compression (630) and an example of compacting this 4:1 compressed data (650). The uncompressed case 610 has consecutively numbered 32B memory blocks 612-626. Thus, each 32B block (612-626) stores one uncompressed 32B MU. This is depicted by having each block contain one of eight MUs, which are consecutively labeled MU0-MU7.

The data in 630 illustrates an example of 4:1 compression separately on MU0-3 (632-638) and MU4-7 (640-646). Block 632 stores the 2:1 compressed result of MU0 (612) and block MU1 (614) and for that reason is labeled MU01. Blocks 634 and 636 store the data from MU2 (616) and MU3 (618) in uncompressed states. Block 640 stores MU4-7 (620-626) in a 4:1 compressed state and for that reason is labeled MU4-7. The remaining blocks (638, 642, 644, and 446) are unused.

Consider what happens if the four 32B blocks of compressed data in 630 (632, 634, 626, and 640) are accessed at 64B granularity, that is, accessing pairs of memory units. It is necessary to also read MU 638 and 642, even though they contain no useful data. If instead the data is accessed at 128B granularity, the situation is even worse: all eight blocks 632-646 must be accessed, even though only three of the eight contain compressed data.

Example scenario 650 has consecutively numbered 32B memory blocks 652-666 that compact the compressed data stored in 630. The first three blocks (652, 654, and 656) store compressed data MU01 and uncompressed data MU2 and MU3, just as in 630. However, 658 stores compressed data MU4-7, which in 630 is stored in 640. The remaining blocks (640, 642, 644, and 646) are unused.

Due to compaction, reading this data at 64B and 128B granularity results in no excess accesses at all. In both cases, blocks 652-659 are accessed and unused blocks 660-660 are not. As a result, no memory bandwidth or cache memory is wasted for access granularities 2× to 4× the size of the memory unit size.

Selecting a Compression Format

It is possible that the same data could be compressed in multiple ways. For example, if two pairs of MUs are each 2:1 compressible, then they are also 4:2 compressible as a group of four. The result is that two different encodings may be used to specify the same compression. So, selecting an optimal encoding to use for each data block is desirable.

The optimal encoding could be chosen to achieve either maximal compression or minimal waste bandwidth due to accessing a multi-MU compression format when only a subset of the MUs are required. Optimizing for maximal compression involves selecting the smallest compressed format. Optimizing for minimal waste bandwidth requires selecting the smallest block size possible. The following process allows trading off the wasted bandwidth against the compression ratio.

Figure 7:
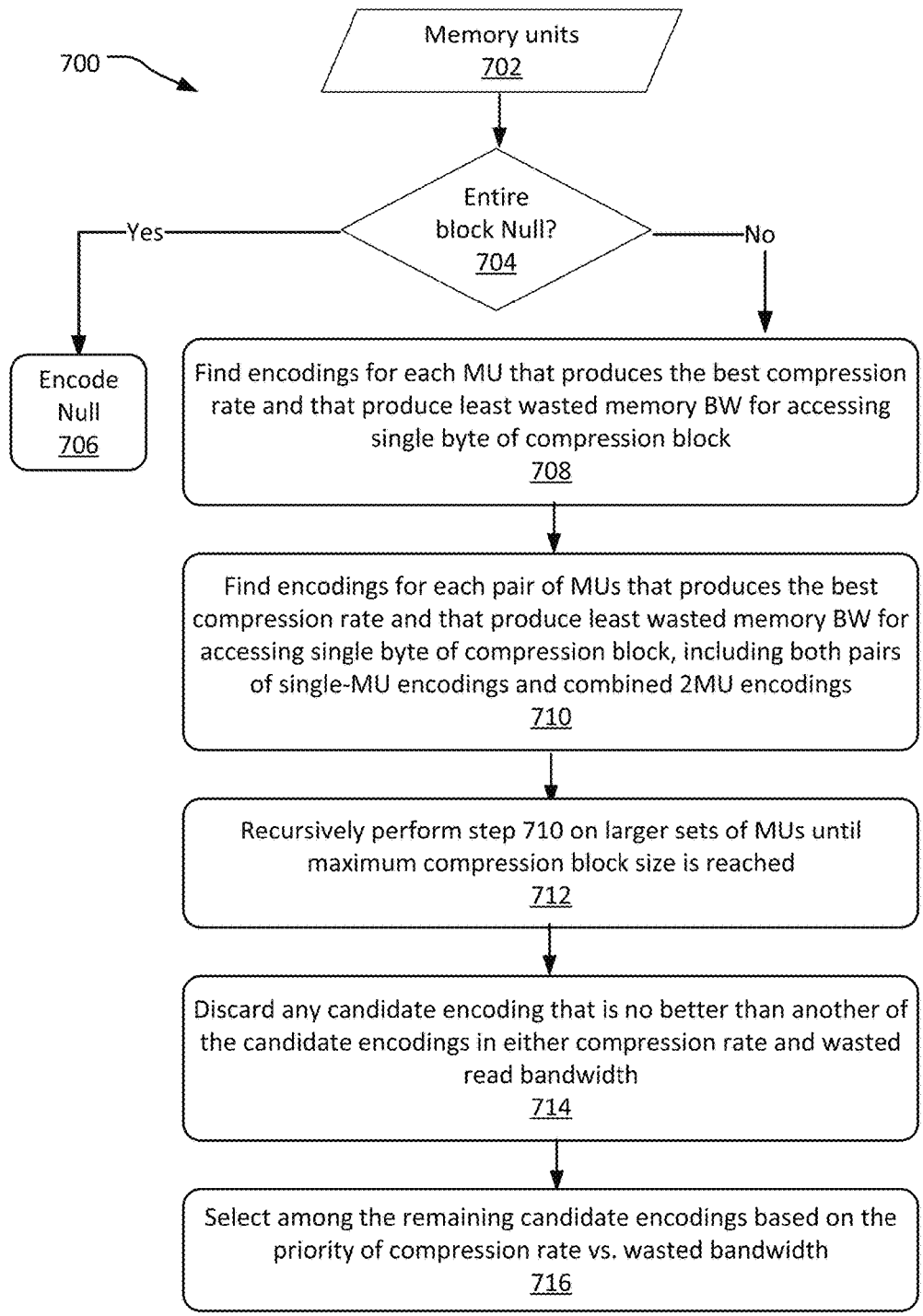
FIG. 7 illustrates an example process illustrating how to select one of several possible compression choices to trade off wasted bandwidth against the compression ration obtained, in accordance with the technology described herein.

FIG. 7 shows an example process 700 illustrating the technology described herein related to how to select one of several possible compression choices to trade off wasted bandwidth against the compression ration obtained. The example process 700 may be implemented as part of a computer graphics system. The process 700 is implemented to achieve an optimal encoding with hierarchical lossless compression with optional null data support. This process is designed to achieve a balance between maximal compression and minimal wasted read bandwidth due to accessing a multi-MU compression format when only a subset of the MUs are required.

With this process 700, a computer graphics system (CG system) optimizes the encoding a chain (or a single link) of metadata designed to encode hierarchically for memory units (e.g., 702) associated with a texture space. The MUs be losslessly compressed with null data support in accordance with the technologies described herein.

At block 704, the CG system determines if the entire block of memory (encoded by the metadata) is Null. If so, then at block 706, the CG system encodes the null value in the metadata. If not, then the process proceeds to block 708.

[99] At block 708, the CG system finds the encodings for each MU that produces the best compression rate and that produce the least wasted memory BW from accessing a single byte of the compression block.

Let Compressed size be C and let bandwidth required be B. Then each possible compression encoding has a pair of numbers (C,B) associated with it. At each allowed compression block size, compare each pair of possible compression encodings.

Define that the pair has values (C1, B1) and (C2, B2). Remove (C1, B1) from consideration if C1>C2 and B1>B2. Remove (C2, B2) from consideration if C2>=C1 and B2>=B1.

That is, compare each pair of encodings and eliminate one if the other is as good or better for both compression size and wasted memory bandwidth. At the end, assign weighting factors to C and B. Multiply each remaining (C,B) pair by the weighting factors and add them. The smallest result is the compression encoding to use.

The CG system identifies the optimal encoding of each pair of MUs in the compression block and encodes accordingly. Referring to the compression alternatives in Table 1, the best case is achieved if the pair of MUs can be encoded using the clear value, since that requires 0 MUs of storage. The next choice is a 2:1 compression format. If none of those are possible, the pair of MUs is left uncompressed. None of these choices require any wasted read bandwidth, since in all of these cases accessing a single MU does not require reading any other MU. This stage produces a candidate encoding consisting of 2-MU compression for each pair or MUs in the compression block.

At block 710, the CG system finds the encodings for each pair of MUs that produces the best compression rate and that produce the least wasted memory BW from accessing a single byte of the compression block, including both pairs of single-MU encodings and combined 2MU encodings.

The CG system identifies the optimal encoding of each set of four MUs in the compression block and encodes accordingly. Referring to Table 2, the best alternatives are the 2:1 compression of even/odd or inner/outer MU pairs. These achieve the best compression and do not require any wasted read bandwidth, since if only one MU is needed, only one MU needs to be accessed. The next best alternative is 4:2 compression. This results in the same compression density, but may result in wasted read bandwidth, since both compressed MUs must be accessed, even if only one is needed. The remaining alternative, 4:3 compression, both decreases the amount of compression and increases the potential wasted read bandwidth. If the 4-MUs cannot be compressed as a group, then this stage produces no candidate encoding for that set of 4-MUs.

At block 712, the CG system recursively performs step 710 on larger sets of MUs until the maximum compression block size is reached.

The CG system identifies the optimal encoding for sets of 8, 16 etc, and encodes accordingly. MUs in the compression block, up to the size of the compression block. As for block 710, no candidate encoding is produced if the MUs cannot be compressed as a set. If one or more encodings is possible, then two encodings are selected. The first has the best compression rate, and among those with the best compression rate, has the least wasted read bandwidth. The second has the least wasted read bandwidth, and among those with the least wasted read bandwidth, has the best compression rate. In most cases these two criteria will select the same encoding, but not always. For example, 8-MU compression could include the alternatives of 8:4 compression or alternately compressing the first two and last two MUs 4:2 while leaving the other four uncompressed. The former encoding has better compression 4 MUs instead of 6), but the latter has lower potential wasted read bandwidth (one extra MU instead of three).

Block 712 then produces additional 8-MU encodings by producing all combinations of candidate 2-MU and 4-MU encodings on subsets of the compression block. For example, if an 8-MU block can be compressed with the first half using a 4-MU encoding, then it would generate additional 8-MU candidate encodings consisting of the 4-MU encoding with two 2-MU encodings, as well as a candidate encoding consisting of four 2-MU encodings. These are in addition to any 8-MU encoding that this stage may have produced. The same operation is performed for 16-MU or larger compression blocks, if they are supported.

At block 714, the CG system Discard any candidate encoding that is no better than another of the candidate encodings in either compression rate or wasted read bandwidth.

The CG system compares the candidate encodings produced for the compression block, which may be a single compression method for the whole compression block, individual compression methods for each pair of MUs in the compression block, and all other combinations discovered in 712. These encodings are compared based on the total compression achieved for the compression block and for the average wasted read bandwidth of each encoding, based on a model for typical accesses in this resource. The simplest model measures the average number of MU accesses required to read a single MU. More complex models may include a mix of single-MU and multi-MU accesses to the compression block, based on knowledge of typical access patterns to the memory resource being compressed.

Having rated each of the candidate encodings as described, block 714 discards any candidate encoding that has a compression rate that is worse than the compression rate of another encoding, unless it has lower wasted bandwidth. Similarly, 714 discards any candidate encoding that has more wasted bandwidth than another encoding, unless it has a better compression rate. Finally, if two candidate encodings have the same compression rate and wasted bandwidth, one is discarded if it uses larger encoding blocks than the other. If multiple encodings are the same in all three criteria, this stage arbitrarily eliminates all but one of them.

For example, suppose a 4-MU block compresses to 4:2, while its two 2-MU sub-blocks compress 2:2 and 2:1. 4:2 results in better compression (2 MUs instead of 3) but 2:2+2:1 results in lower waste read BW (reading an MU requires 1MU read instead of 2). As a result, both survive the test and are passed to block 718. Alternately, suppose 4-MU block compression results in the even/odd or inner/outer compression methods. In that case the 4-MU encoding has better compression and the same wasted read bandwidth, so the 2:2+2:1 encoding would be eliminated. For a third alternative, if one of the MU pairs could use the clear color and the other was uncompressed, then the 4:2 encoding would be eliminated, since it has the same compression rate (2 MUs) but higher wasted read bandwidth.

Finally, block 716 selects among the remaining candidate encodings based on the priority of compression rate vs. wasted bandwidth.

The CG system selects the encoding to use, based on prioritizing compression rate vs. wasted read bandwidth. The one or more candidate encodings from 714 represent different optimization points. Each can be described with a pair of numbers that count the number of MUs required for the compressed data and the number of MUs required for a typical access. Then an 8-MU compression block could produce a set of candidate encodings such as (8,1), which results from leaving the data uncompressed, (4,4), which results from 8:4 compression, and (6,1.5), which results from leaving one 4-MU block uncompressed and compressing the other 4-MU block 4:2. An absolute priority of best compression would select the (4,4) or 8:4 compression case. An absolute priority of least wasted read bandwidth would select the (8,1) or 8:8 compression case. Taking a weighted sum of the two factors would like select the (6,1.5) or 4:4+4:2 compression case.

System Overview

Figure 8:
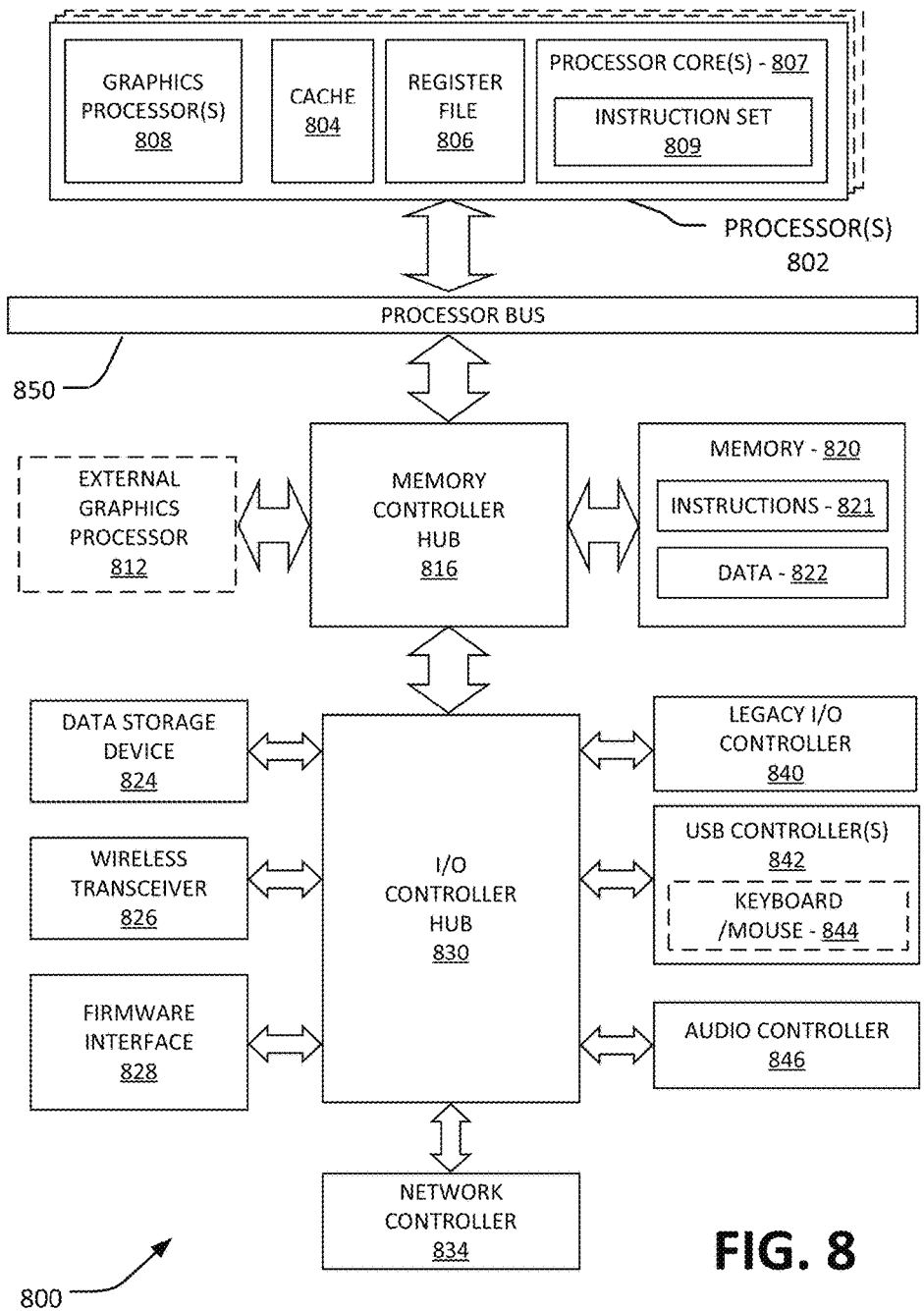
FIG. 8 is a block diagram of a data processing system according to an embodiment.

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In one embodiment, the system 800 is a processing platform incorporated within a system-on-a-chip (SoC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled with a processor bus 810 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random access memory (DRAM) device, a static random access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples with processor bus 810. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

Figure 9:
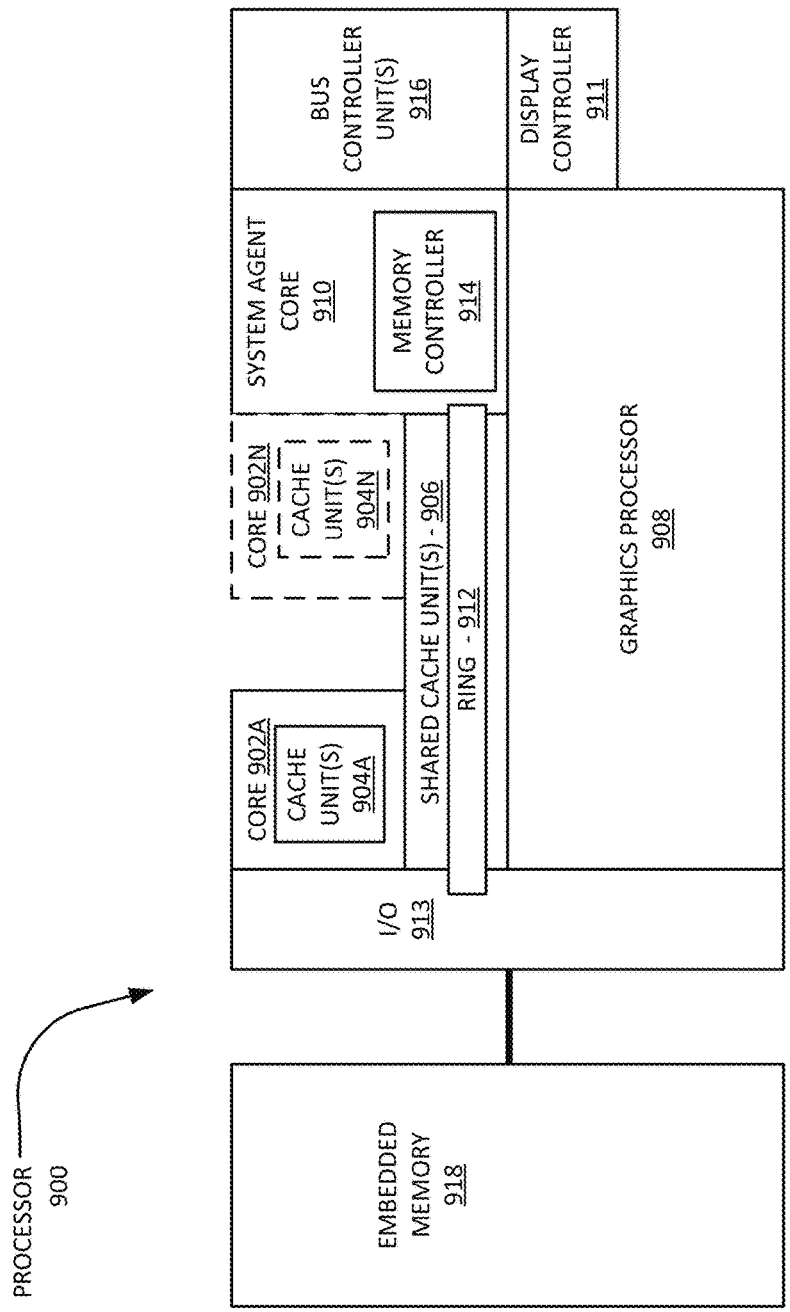
FIG. 9 is a block diagram of an embodiment of a processor having one or more processor cores, an integrated memory controller, and an integrated graphics processor.

FIG. 9 is a block diagram of an embodiment of a processor 900 having one or more processor cores 902A-902N, an integrated memory controller 914, and an integrated graphics processor 908. Those elements of FIG. 9 having the same reference numbers (or names) as the elements of any other figure herein can operate or function in any manner similar to that described elsewhere herein, but are not limited to such. Processor 900 can include additional cores up to and including additional core 902N represented by the dashed lined boxes. Each of processor cores 902A-902N includes one or more internal cache units 904A-904N. In some embodiments each processor core also has access to one or more shared cached units 906.

The internal cache units 904A-904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A-904N.

In some embodiments, processor 900 may also include a set of one or more bus controller units 916 and a system agent core 910. The one or more bus controller units 916 manage a set of peripheral buses, such as one or more Peripheral Component Interconnect buses (e.g., PCI, PCI Express). System agent core 910 provides management functionality for the various processor components. In some embodiments, system agent core 910 includes one or more integrated memory controllers 914 to manage access to various external memory devices (not shown).

In some embodiments, one or more of the processor cores 902A-902N include support for simultaneous multi-threading. In such embodiment, the system agent core 910 includes components for coordinating and operating cores 902A-902N during multi-threaded processing. System agent core 910 may additionally include a power control unit (PCU), which includes logic and components to regulate the power state of processor cores 902A-902N and graphics processor 908.

In some embodiments, processor 900 additionally includes graphics processor 908 to execute graphics processing operations. In some embodiments, the graphics processor 908 couples with the set of shared cache units 906, and the system agent core 910, including the one or more integrated memory controllers 914. In some embodiments, a display controller 911 is coupled with the graphics processor 908 to drive graphics processor output to one or more coupled displays. In some embodiments, display controller 911 may be a separate module coupled with the graphics processor via at least one interconnect, or may be integrated within the graphics processor 908 or system agent core 910.

In some embodiments, a ring based interconnect unit 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring interconnect 912 via an I/O link 913.

The exemplary I/O link 913 represents at least one of multiple varieties of I/O interconnects, including an on package I/O interconnect which facilitates communication between various processor components and a high-performance embedded memory module 918, such as an eDRAM module. In some embodiments, each of the processor cores 902A-902N and graphics processor 908 use embedded memory modules 918 as a shared Last Level Cache.

In some embodiments, processor cores 902A-902N are homogenous cores executing the same instruction set architecture. In another embodiment, processor cores 902A-902N are heterogeneous in terms of instruction set architecture (ISA), where one or more of processor cores 902A-N execute a first instruction set, while at least one of the other cores executes a subset of the first instruction set or a different instruction set. In one embodiment processor cores 902A-902N are heterogeneous in terms of microarchitecture, where one or more cores having a relatively higher power consumption couple with one or more power cores having a lower power consumption. Additionally, processor 900 can be implemented on one or more chips or as an SoC integrated circuit having the illustrated components, in addition to other components.

Figure 10:
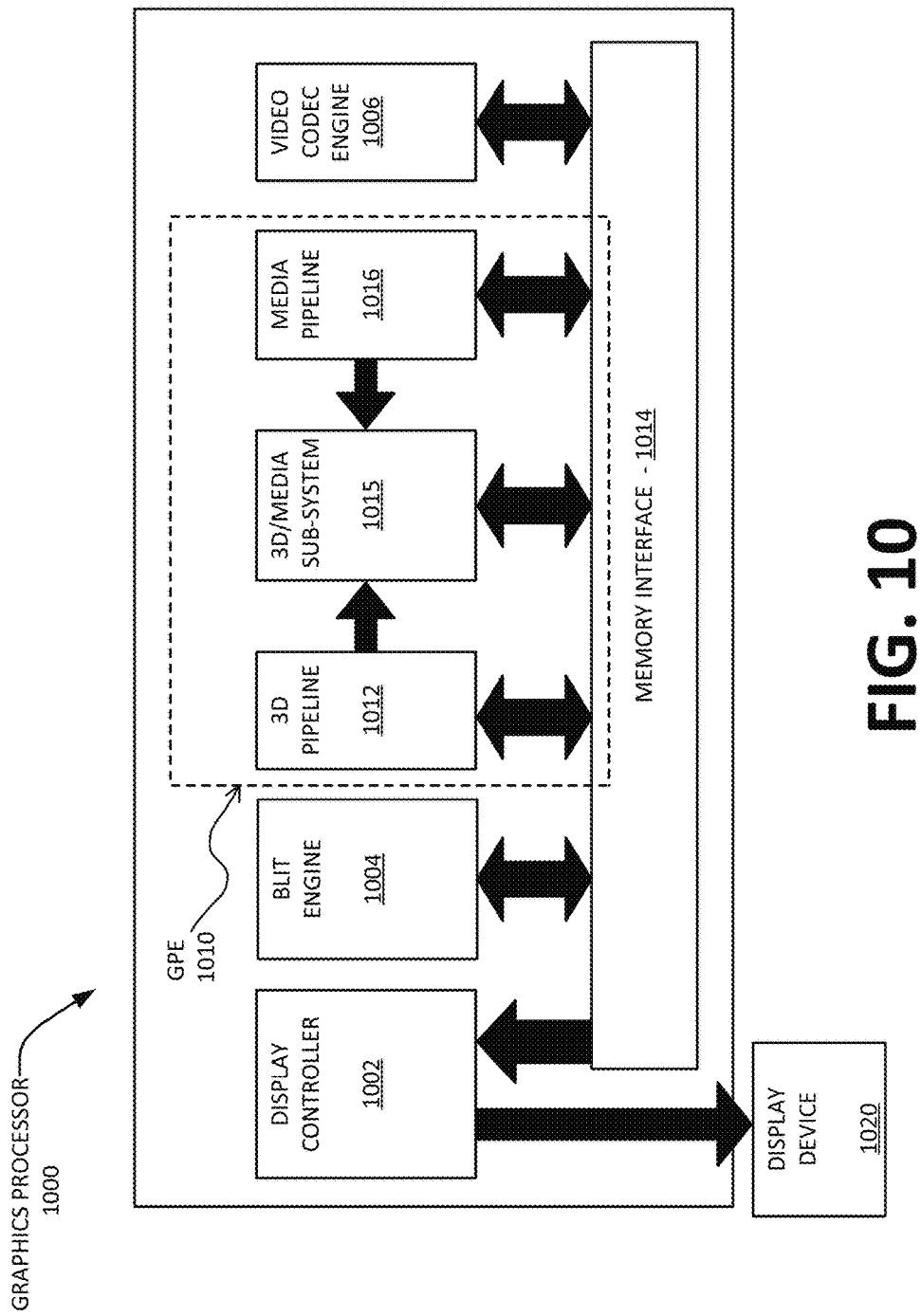
FIG. 10 is a block diagram of one embodiment of a graphics processor which may be a discrete graphics processing unit, or may be graphics processor integrated with a plurality of processing cores.

FIG. 10 is a block diagram of a graphics processor 1000, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1000 includes a memory interface 1014 to access memory. Memory interface 1014 can be an interface to local memory, one or more internal caches, one or more shared external caches, and/or to system memory.

In some embodiments, graphics processor 1000 also includes a display controller 1002 to drive display output data to a display device 1020. Display controller 1002 includes hardware for one or more overlay planes for the display and composition of multiple layers of video or user interface elements. In some embodiments, graphics processor 1000 includes a video codec engine 1006 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1000 includes a block image transfer (BLIT) engine 1004 to perform two-dimensional (2 D) rasterizer operations including, for example, bit-boundary block transfers. However, in one embodiment, 2 D graphics operations are performed using one or more components of graphics processing engine (GPE) 1010. In some embodiments, GPE 1010 is a compute engine for performing graphics operations, including three-dimensional (3D) graphics operations and media operations.

In some embodiments, GPE 1010 includes a 3D pipeline 1012 for performing 3D operations, such as rendering three-dimensional images and scenes using processing functions that act upon 3D primitive shapes (e.g., rectangle, triangle, etc.). The 3D pipeline 1012 includes programmable and fixed function elements that perform various tasks within the element and/or spawn execution threads to a 3D/Media sub-system 1015. While 3D pipeline 1012 can be used to perform media operations, an embodiment of GPE 1010 also includes a media pipeline 1016 that is specifically used to perform media operations, such as video post-processing and image enhancement.

In some embodiments, media pipeline 1016 includes fixed function or programmable logic units to perform one or more specialized media operations, such as video decode acceleration, video de-interlacing, and video encode acceleration in place of, or on behalf of video codec engine 1006. In some embodiments, media pipeline 1016 additionally includes a thread spawning unit to spawn threads for execution on 3D/Media sub-system 1015. The spawned threads perform computations for the media operations on one or more graphics execution units included in 3D/Media subsystem 1015.

In some embodiments, 3D/Media subsystem 1015 includes logic for executing threads spawned by 3D pipeline 1012 and media pipeline 1016. In one embodiment, the pipelines send thread execution requests to 3D/Media subsystem 1015, which includes thread dispatch logic for arbitrating and dispatching the various requests to available thread execution resources. The execution resources include an array of graphics execution units to process the 3D and media threads. In some embodiments, 3D/Media subsystem 1015 includes one or more internal caches for thread instructions and data. In some embodiments, the subsystem also includes shared memory, including registers and addressable memory, to share data between threads and to store output data.

Graphics Processing Engine

Figure 11:
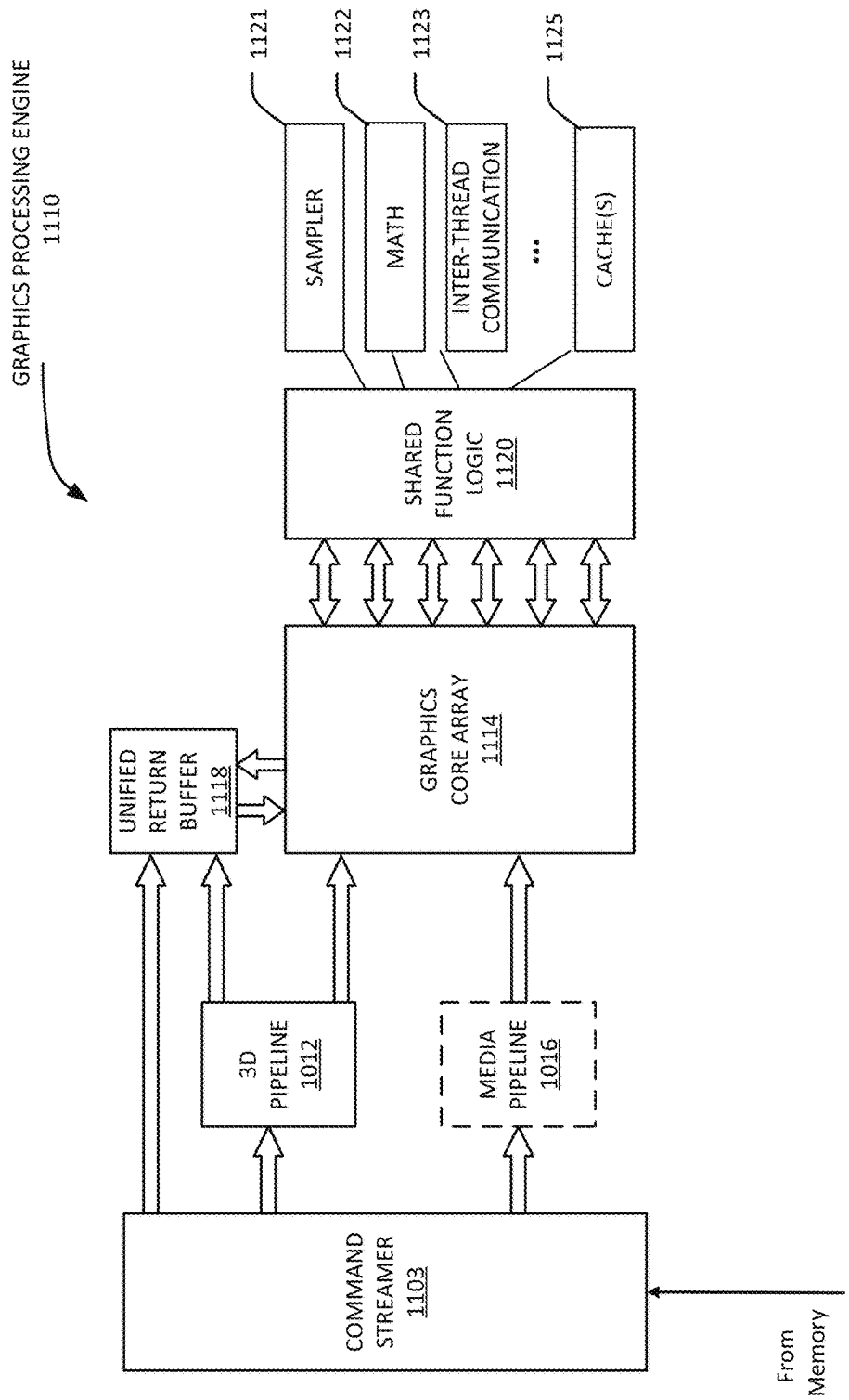
FIG. 11 is a block diagram of an embodiment of a graphics processing engine for a graphics processor.

FIG. 11 is a block diagram of a graphics processing engine 1110 of a graphics processor in accordance with some embodiments. In one embodiment, the graphics processing engine (GPE) 1110 is a version of the GPE 1010 shown in FIG. 10. Elements of FIG. 11 having the same reference numbers (or names) as the elements of any other figure herein can operate or function in any manner similar to that described elsewhere herein, but are not limited to such. For example, the 3D pipeline 1012 and media pipeline 1016 of FIG. 10 are illustrated. The media pipeline 1016 is optional in some embodiments of the GPE 1110 and may not be explicitly included within the GPE 1110. For example and in at least one embodiment, a separate media and/or image processor is coupled to the GPE 1110.

In some embodiments, GPE 1110 couples with or includes a command streamer 1103, which provides a command stream to the 3D pipeline 1012 and/or media pipelines 1016. In some embodiments, command streamer 1103 is coupled with memory, which can be system memory, or one or more of internal cache memory and shared cache memory. In some embodiments, command streamer 1103 receives commands from the memory and sends the commands to 3D pipeline 1012 and/or media pipeline 1016. The commands are directives fetched from a ring buffer, which stores commands for the 3D pipeline 1012 and media pipeline 1016. In one embodiment, the ring buffer can additionally include batch command buffers storing batches of multiple commands. The commands for the 3D pipeline 1012 can also include references to data stored in memory, such as but not limited to vertex and geometry data for the 3D pipeline 1012 and/or image data and memory objects for the media pipeline 1016. The 3D pipeline 1012 and media pipeline 1016 process the commands and data by performing operations via logic within the respective pipelines or by dispatching one or more execution threads to a graphics core array 1114.

In various embodiments the 3D pipeline 1012 can execute one or more shader programs, such as vertex shaders, geometry shaders, pixel shaders, fragment shaders, compute shaders, or other shader programs, by processing the instructions and dispatching execution threads to the graphics core array 1114. The graphics core array 1114 provides a unified block of execution resources. Multi-purpose execution logic (e.g., execution units) within the graphic core array 1114 includes support for various 3D API shader languages and can execute multiple simultaneous execution threads associated with multiple shaders.

In some embodiments the graphics core array 1114 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 807 of FIG. 8 or core 902A-902N as in FIG. 9.

Output data generated by threads executing on the graphics core array 1114 can output data to memory in a unified return buffer (URB) 1118. The URB 1118 can store data for multiple threads. In some embodiments the URB 1118 may be used to send data between different threads executing on the graphics core array 1114. In some embodiments the URB 1118 may additionally be used for synchronization between threads on the graphics core array and fixed function logic within the shared function logic 1120.

In some embodiments, graphics core array 1114 is scalable, such that the array includes a variable number of graphics cores, each having a variable number of execution units based on the target power and performance level of GPE 1110. In one embodiment the execution resources are dynamically scalable, such that execution resources may be enabled or disabled as needed.

The graphics core array 1114 couples with shared function logic 1120 that includes multiple resources that are shared between the graphics cores in the graphics core array. The shared functions within the shared function logic 1120 are hardware logic units that provide specialized supplemental functionality to the graphics core array 1114. In various embodiments, shared function logic 1120 includes but is not limited to sampler 1121, math 1122, and inter-thread communication (ITC) 1123 logic. Additionally, some embodiments implement one or more cache(s) 1125 within the shared function logic 1120. A shared function is implemented where the demand for a given specialized function is insufficient for inclusion within the graphics core array 1114. Instead a single instantiation of that specialized function is implemented as a stand-alone entity in the shared function logic 1120 and shared among the execution resources within the graphics core array 1114. The precise set of functions that are shared between the graphics core array 1114 and included within the graphics core array 1114 varies between embodiments.

Figure 12:
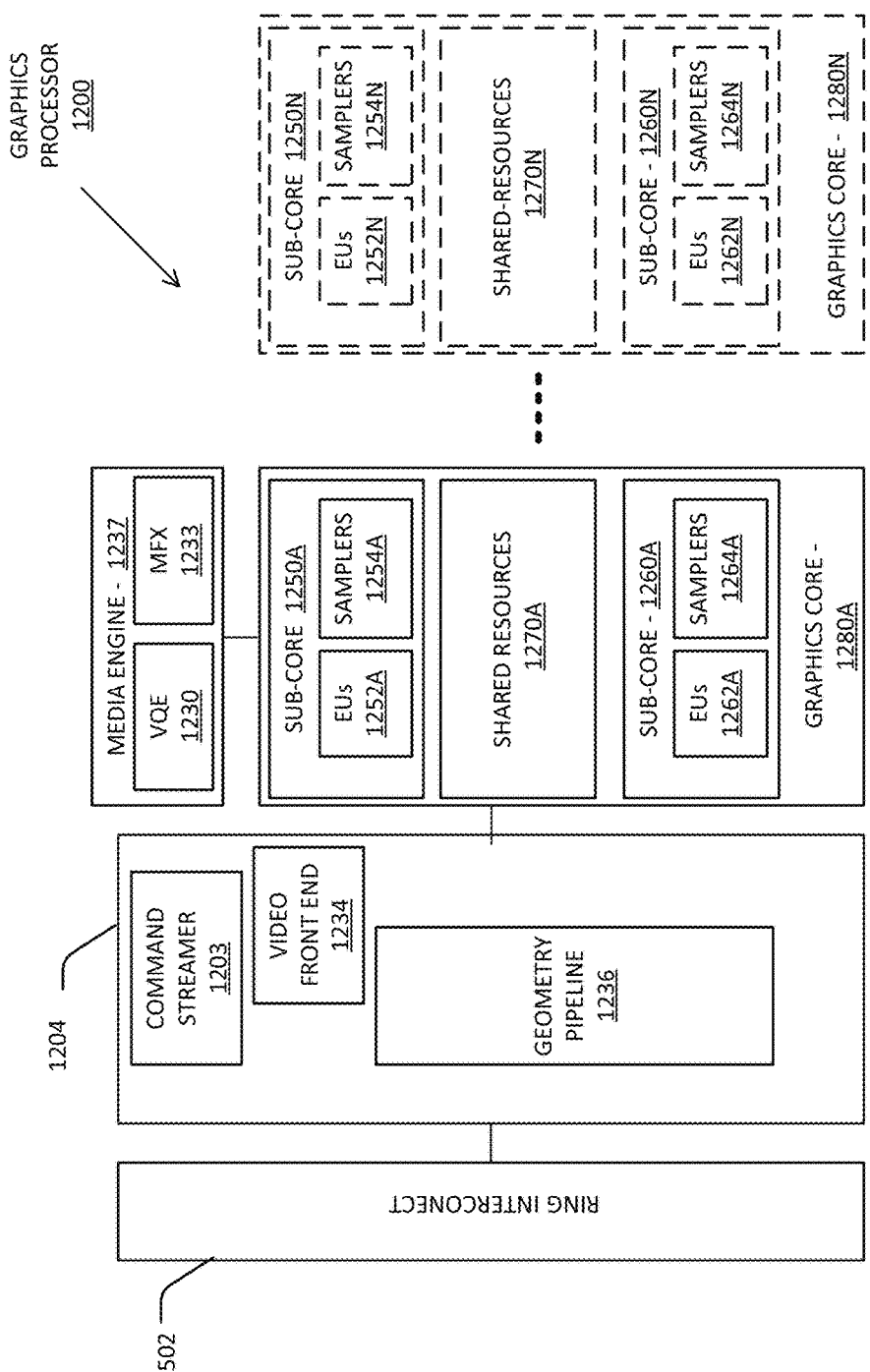
FIG. 12 is a block diagram of another embodiment of a graphics processor.

FIG. 12 is a block diagram of another embodiment of a graphics processor 1200. Elements of FIG. 12 having the same reference numbers (or names) as the elements of any other figure herein can operate or function in any manner similar to that described elsewhere herein, but are not limited to such.

In some embodiments, graphics processor 1200 includes a ring interconnect 1202, a pipeline front-end 1204, a media engine 1237, and graphics cores 1280A-1280N. In some embodiments, ring interconnect 1202 couples the graphics processor to other processing units, including other graphics processors or one or more general-purpose processor cores. In some embodiments, the graphics processor is one of many processors integrated within a multi-core processing system.

In some embodiments, graphics processor 1200 receives batches of commands via ring interconnect 1202. The incoming commands are interpreted by a command streamer 1203 in the pipeline front-end 1204. In some embodiments, graphics processor 1200 includes scalable execution logic to perform 3D geometry processing and media processing via the graphics core(s) 1280A-1280N. For 3D geometry processing commands, command streamer 1203 supplies commands to geometry pipeline 1236. For at least some media processing commands, command streamer 1203 supplies the commands to a video front end 1234, which couples with a media engine 1237. In some embodiments, media engine 1237 includes a Video Quality Engine (VQE) 1230 for video and image post-processing and a multi-format encode/decode (MFX) 1233 engine to provide hardware-accelerated media data encode and decode. In some embodiments, geometry pipeline 1236 and media engine 1237 each generate execution threads for the thread execution resources provided by at least one graphics core 1280A.

In some embodiments, graphics processor 1200 includes scalable thread execution resources featuring modular cores 1280A-1280N (sometimes referred to as core slices), each having multiple sub-cores 1250A-1250N, 1260A-1260N (sometimes referred to as core sub-slices). In some embodiments, graphics processor 1200 can have any number of graphics cores 1280A through 1280N. In some embodiments, graphics processor 1200 includes a graphics core 1280A having at least a first sub-core 1250A and a second sub-core 1260A. In other embodiments, the graphics processor is a low power processor with a single sub-core (e.g., 1250A). In some embodiments, graphics processor 1200 includes multiple graphics cores 1280A-1280N, each including a set of first sub-cores 1250A-1250N and a set of second sub-cores 1260A-1260N. Each sub-core in the set of first sub-cores 1250A-1250N includes at least a first set of execution units 1252A-1252N and media/texture samplers 1254A-1254N. Each sub-core in the set of second sub-cores 1260A-1260N includes at least a second set of execution units 1262A-1262N and samplers 1264A-1264N. In some embodiments, each sub-core 1250A-1250N, 1260A-1260N shares a set of shared resources 1270A-1270N. In some embodiments, the shared resources include shared cache memory and pixel operation logic. Other shared resources may also be included in the various embodiments of the graphics processor.

Execution Units

Figure 13:
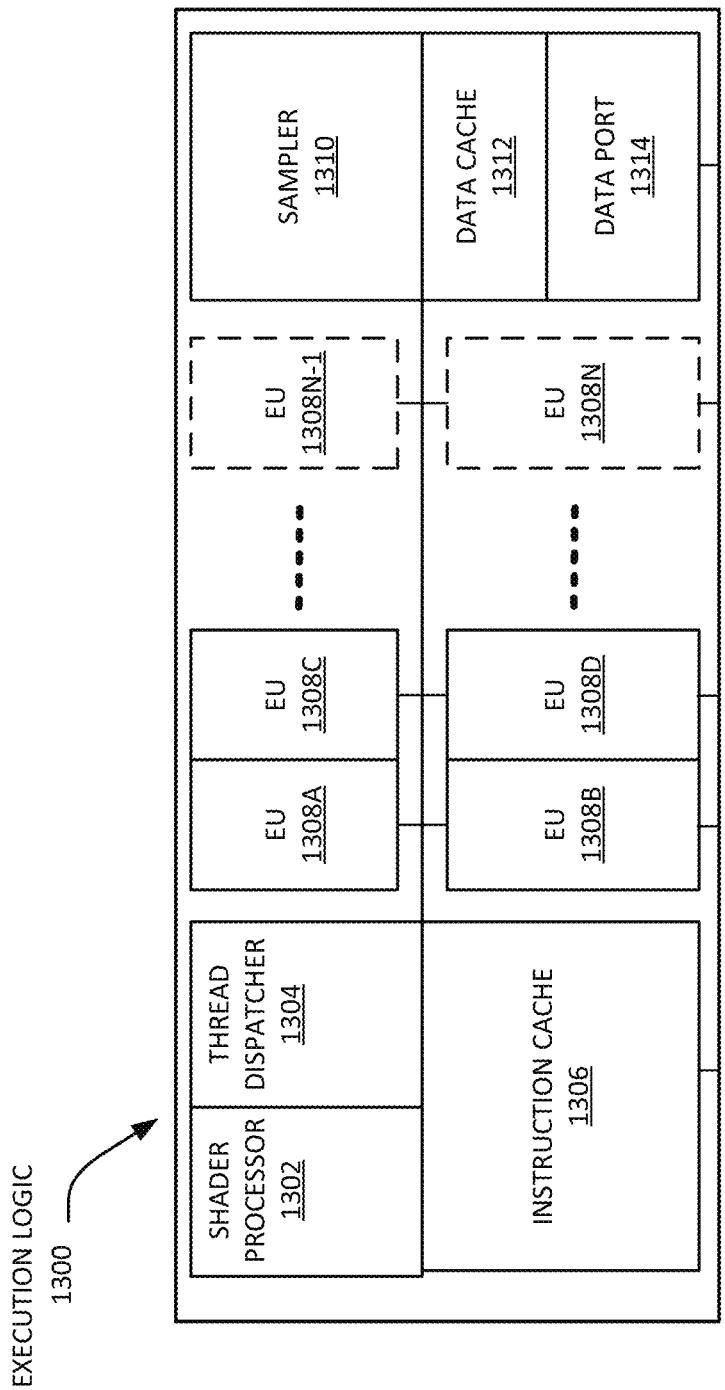
FIG. 13 illustrates thread execution logic including an array of processing elements employed in one embodiment of a graphics processing engine.

FIG. 13 illustrates thread execution logic 1300 including an array of processing elements employed in some embodiments of a GPE. Elements of FIG. 13 having the same reference numbers (or names) as the elements of any other figure herein can operate or function in any manner similar to that described elsewhere herein, but are not limited to such.

In some embodiments, thread execution logic 1300 includes a shader processor 1302, a thread dispatcher 1304, instruction cache 1306, a scalable execution unit array including a plurality of execution units 1308A-1308N, a sampler 1310, a data cache 1312, and a data port 1314. In one embodiment the scalable execution unit array can dynamically scale by enabling or disabling one or more execution units (e.g., any of execution unit 1308A, 1308B, 1308C, 1308D, through 1308N-1 and 1308N) based on the computational requirements of a workload. In one embodiment the included components are interconnected via an interconnect fabric that links to each of the components. In some embodiments, thread execution logic 1300 includes one or more connections to memory, such as system memory or cache memory, through one or more of instruction cache 1306, data port 1314, sampler 1310, and execution units 1308A-1308N. In some embodiments, each execution unit (e.g. 1308A) is a stand-alone programmable general purpose computational unit that is capable of executing multiple simultaneous hardware threads while processing multiple data elements in parallel for each thread. In various embodiments, the array of execution units 1308A-1308N is scalable to include any number individual execution units.

In some embodiments, the execution units 1308A-608N are primarily used to execute shader programs. A shader processor 1302 can process the various shader programs and dispatch execution threads associated with the shader programs via a thread dispatcher 1304. In one embodiment the thread dispatcher includes logic to arbitrate thread initiation requests from the graphics and media pipelines and instantiate the requested threads on one or more execution unit in the execution units 1308A-1308N. For example, the geometry pipeline (e.g., 1236 of FIG. 12) can dispatch vertex, tessellation, or geometry shaders to the thread execution logic 1300 (FIG. 13) for processing. In some embodiments, thread dispatcher 1304 can also process runtime thread spawning requests from the executing shader programs.

In some embodiments, the execution units 1308A-1308N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 1308A-1308N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 1308A-1308N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 1308A-1308N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 1308A-1308N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 1306) are included in the thread execution logic 1300 to cache thread instructions for the execution units. In some embodiments, one or more data caches (e.g., 1312) are included to cache thread data during thread execution. In some embodiments, a sampler 1310 is included to provide texture sampling for 3D operations and media sampling for media operations. In some embodiments, sampler 1310 includes specialized texture or media sampling functionality to process texture or media data during the sampling process before providing the sampled data to an execution unit.

During execution, the graphics and media pipelines send thread initiation requests to thread execution logic 1300 via thread spawning and dispatch logic. Once a group of geometric objects has been processed and rasterized into pixel data, pixel processor logic (e.g., pixel shader logic, fragment shader logic, etc.) within the shader processor 1302 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 1302 then executes an application programming interface (API)-supplied pixel or fragment shader program. To execute the shader program, the shader processor 1302 dispatches threads to an execution unit (e.g., 1308A) via thread dispatcher 1304. In some embodiments, pixel shader 1302 uses texture sampling logic in the sampler 1310 to access texture data in texture maps stored in memory. Arithmetic operations on the texture data and the input geometry data compute pixel color data for each geometric fragment, or discards one or more pixels from further processing.

In some embodiments, the data port 1314 provides a memory access mechanism for the thread execution logic 1300 output processed data to memory for processing on a graphics processor output pipeline. In some embodiments, the data port 1314 includes or couples with one or more cache memories (e.g., data cache 1312) to cache data for memory access via the data port.

Figure 14:
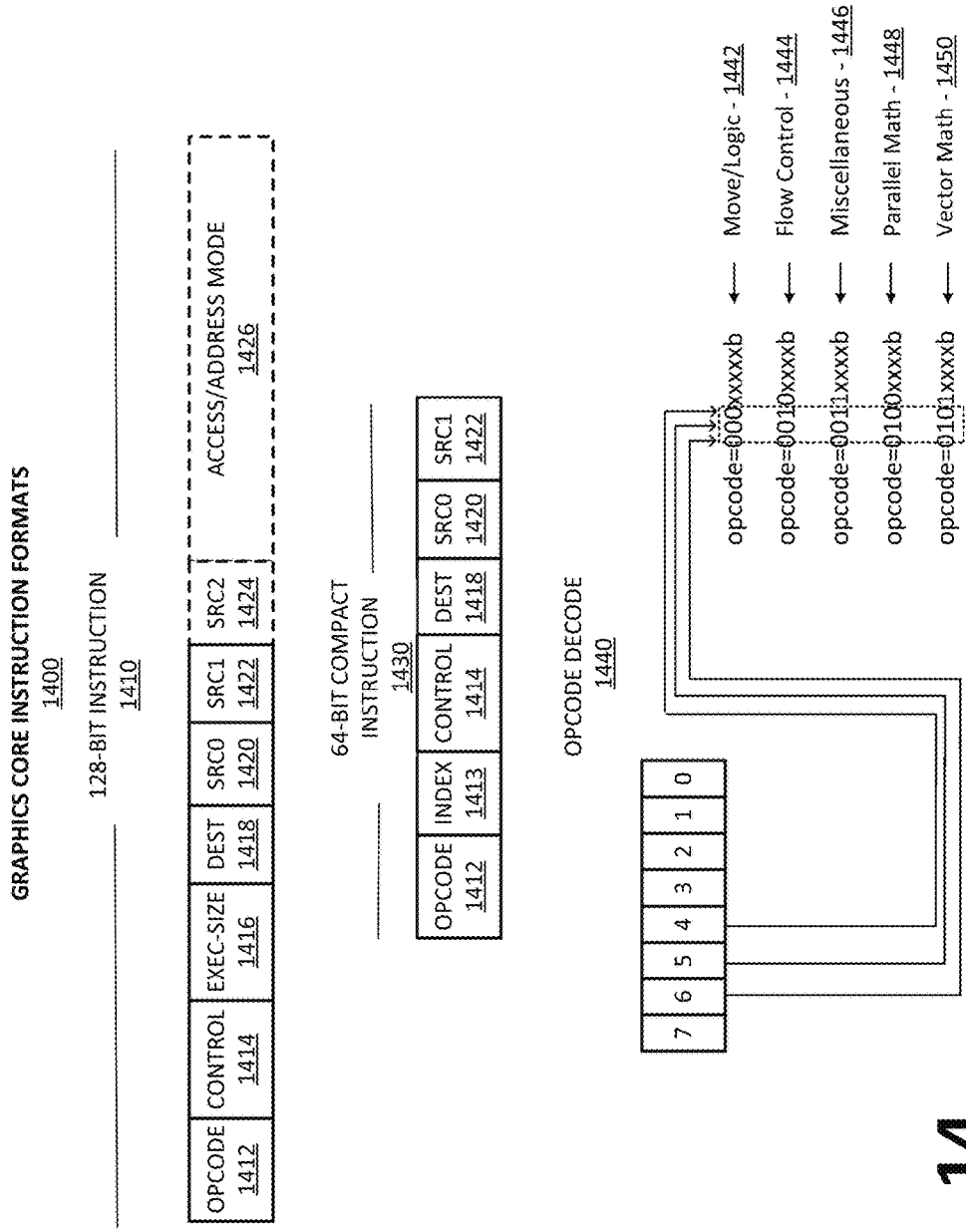
FIG. 14 is a block diagram illustrating a graphics processor execution unit instruction format according to an embodiment.

FIG. 14 is a block diagram illustrating a graphics processor instruction formats 1400 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 1400 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 1410. A 64-bit compacted instruction format 1430 is available for some instructions based on the selected instruction, instruction options, and number of operands. The native 128-bit instruction format 1410 provides access to all instruction options, while some options and operations are restricted in the 64-bit format 1430. The native instructions available in the 64-bit format 1430 vary by embodiment. In some embodiments, the instruction is compacted in part using a set of index values in an index field 1413. The execution unit hardware references a set of compaction tables based on the index values and uses the compaction table outputs to reconstruct a native instruction in the 128-bit instruction format 1410.

For each format, instruction opcode 1412 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 1414 enables control over certain execution options, such as channels selection (e.g., predication) and data channel order (e.g., swizzle). For instructions in the 128-bit instruction format 1410 an exec-size field 1416 limits the number of data channels that will be executed in parallel. In some embodiments, exec-size field 1416 is not available for use in the 64-bit compact instruction format 1430.

Some execution unit instructions have up to three operands including two source operands, src0 1420, src1 1422, and one destination 1418. In some embodiments, the execution units support dual destination instructions, where one of the destinations is implied. Data manipulation instructions can have a third source operand (e.g., SRC2 1424), where the instruction opcode 1412 determines the number of source operands. An instruction's last source operand can be an immediate (e.g., hard-coded) value passed with the instruction.

In some embodiments, the 128-bit instruction format 1410 includes an access/address mode field 1426 specifying, for example, whether direct register addressing mode or indirect register addressing mode is used. When direct register addressing mode is used, the register address of one or more operands is directly provided by bits in the instruction.

In some embodiments, the 128-bit instruction format 1410 includes an access/address mode field 1426, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 1426 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 1412 bit-fields to simplify Opcode decode 1440. For an 8-bit opcode, bits 4, 5, and 6 allow the execution unit to determine the type of opcode. The precise opcode grouping shown is merely an example. In some embodiments, a move and logic opcode group 1442 includes data movement and logic instructions (e.g., move (mov), compare (cmp)). In some embodiments, move and logic group 1442 shares the five most significant bits (MSB), where move (mov) instructions are in the form of 0000xxxxb and logic instructions are in the form of 0001xxxxb. A flow control instruction group 1444 (e.g., call, jump (jmp)) includes instructions in the form of 0010xxxxb (e.g., 0x20). A miscellaneous instruction group 1446 includes a mix of instructions, including synchronization instructions (e.g., wait, send) in the form of 0011xxxxb (e.g., 0x30). A parallel math instruction group 1448 includes component-wise arithmetic instructions (e.g., add, multiply (mul)) in the form of 0100xxxxb (e.g., 0x40). The parallel math group 1448 performs the arithmetic operations in parallel across data channels. The vector math group 1450 includes arithmetic instructions (e.g., dp4) in the form of 0101xxxxb (e.g., 0x50). The vector math group performs arithmetic such as dot product calculations on vector operands.

Graphics Pipeline

Figure 15:
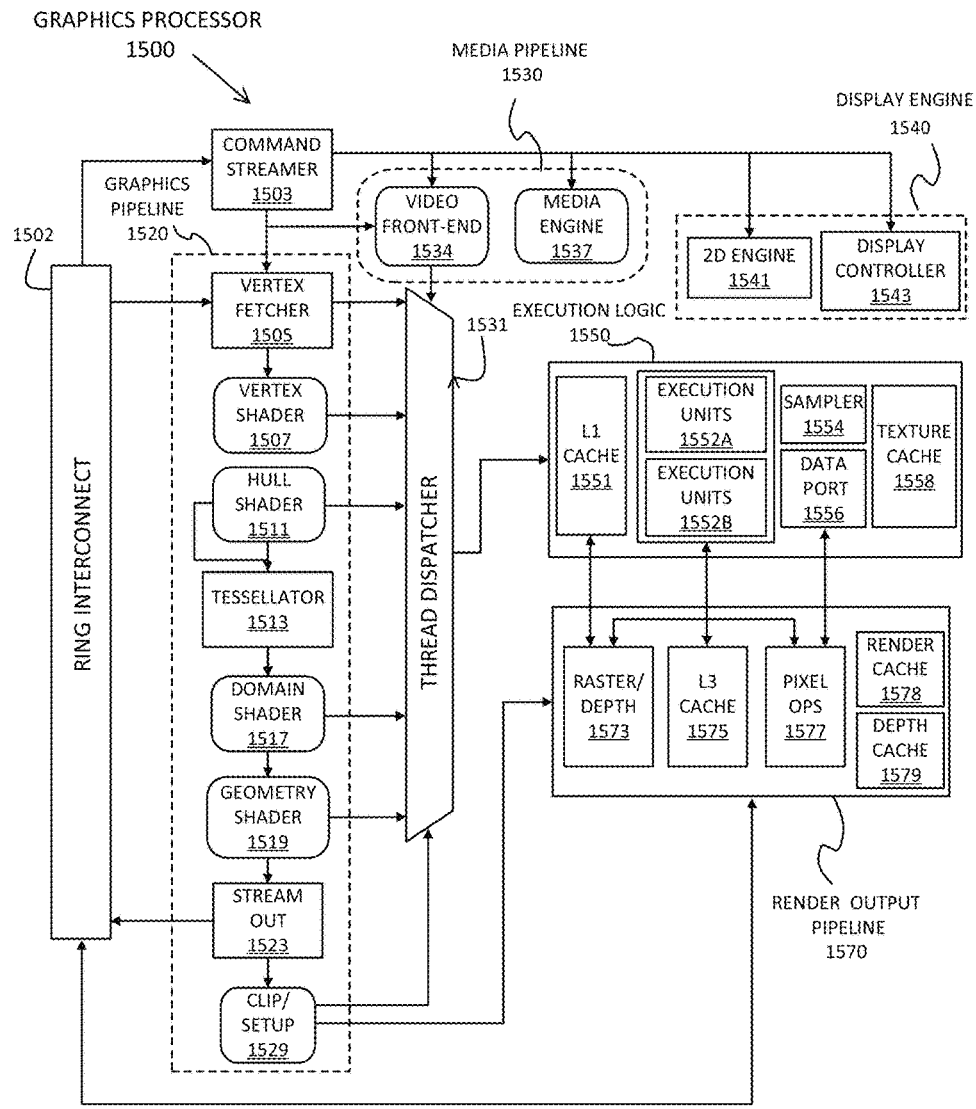
FIG. 15 is a block diagram of another embodiment of a graphics processor which includes a graphics pipeline, a media pipeline, a display engine, thread execution logic, and a render output pipeline.

FIG. 15 is a block diagram of another embodiment of a graphics processor 1500. Elements of FIG. 15 having the same reference numbers (or names) as the elements of any other figure herein can operate or function in any manner similar to that described elsewhere herein, but are not limited to such.

In some embodiments, graphics processor 1500 includes a graphics pipeline 1520, a media pipeline 1530, a display engine 1540, thread execution logic 1550, and a render output pipeline 1570. In some embodiments, graphics processor 1500 is a graphics processor within a multi-core processing system that includes one or more general purpose processing cores. The graphics processor is controlled by register writes to one or more control registers (not shown) or via commands issued to graphics processor 1500 via a ring interconnect 1502. In some embodiments, ring interconnect 1502 couples graphics processor 1500 to other processing components, such as other graphics processors or general-purpose processors. Commands from ring interconnect 1502 are interpreted by a command streamer 1503, which supplies instructions to individual components of graphics pipeline 1520 or media pipeline 1530.

In some embodiments, command streamer 1503 directs the operation of a vertex fetcher 1505 that reads vertex data from memory and executes vertex-processing commands provided by command streamer 1503. In some embodiments, vertex fetcher 1505 provides vertex data to a vertex shader 1507, which performs coordinate space transformation and lighting operations to each vertex. In some embodiments, vertex fetcher 1505 and vertex shader 1507 execute vertex-processing instructions by dispatching execution threads to execution units 1552A-1552B via a thread dispatcher 1531.

In some embodiments, execution units 1552A-1552B are an array of vector processors having an instruction set for performing graphics and media operations. In some embodiments, execution units 1552A, 1552B have an attached L1 cache 1551 that is specific for each array or shared between the arrays. The cache can be configured as a data cache, an instruction cache, or a single cache that is partitioned to contain data and instructions in different partitions.

In some embodiments, graphics pipeline 1520 includes tessellation components to perform hardware-accelerated tessellation of 3D objects. In some embodiments, a programmable hull shader 1511 configures the tessellation operations. A programmable domain shader 1517 provides back-end evaluation of tessellation output. A tessellator 1513 operates at the direction of hull shader 1511 and contains special purpose logic to generate a set of detailed geometric objects based on a coarse geometric model that is provided as input to graphics pipeline 1520. In some embodiments, if tessellation is not used, tessellation components (e.g., hull shader 1511, tessellator 1513, and domain shader 1517) can be bypassed.

In some embodiments, complete geometric objects can be processed by a geometry shader 1519 via one or more threads dispatched to execution units 1552A, 1552B, or can proceed directly to the clipper 1529. In some embodiments, the geometry shader operates on entire geometric objects, rather than vertices or patches of vertices as in previous stages of the graphics pipeline. If the tessellation is disabled the geometry shader 1519 receives input from the vertex shader 1507. In some embodiments, geometry shader 1519 is programmable by a geometry shader program to perform geometry tessellation if the tessellation units are disabled.

Before rasterization, a clipper 1529 processes vertex data. The clipper 1529 may be a fixed function clipper or a programmable clipper having clipping and geometry shader functions. In some embodiments, a rasterizer and depth test component 1573 in the render output pipeline 1570 dispatches pixel shaders to convert the geometric objects into their per pixel representations. In some embodiments, pixel shader logic is included in thread execution logic 1550. In some embodiments, an application can bypass the rasterizer and depth test component 1573 and access un-rasterized vertex data via a stream out unit 1523.

The graphics processor 1500 has an interconnect bus, interconnect fabric, or some other interconnect mechanism that allows data and message passing amongst the major components of the processor. In some embodiments, execution units 1552A, 1552B and associated cache(s) 1551, texture and media sampler 1554, and texture/sampler cache 1558 interconnect via a data port 1556 to perform memory access and communicate with render output pipeline components of the processor. In some embodiments, sampler 1554, caches 1551, 1558 and execution units 1552A, 1552B each have separate memory access paths.

In some embodiments, render output pipeline 1570 contains a rasterizer and depth test component 1573 that converts vertex-based objects into an associated pixel-based representation. In some embodiments, the rasterizer logic includes a windower/masker unit to perform fixed function triangle and line rasterization. An associated render cache 1578 and depth cache 1579 are also available in some embodiments. A pixel operations component 1577 performs pixel-based operations on the data, though in some instances, pixel operations associated with 2 D operations (e.g. bit block image transfers with blending) are performed by the 2 D engine 1541, or substituted at display time by the display controller 1543 using overlay display planes. In some embodiments, a shared L3 cache 1575 is available to all graphics components, allowing the sharing of data without the use of main system memory.

In some embodiments, graphics processor media pipeline 1530 includes a media engine 1537 and a video front end 1534. In some embodiments, video front end 1534 receives pipeline commands from the command streamer 1503. In some embodiments, media pipeline 1530 includes a separate command streamer. In some embodiments, video front-end 1534 processes media commands before sending the command to the media engine 1537. In some embodiments, media engine 1537 includes thread spawning functionality to spawn threads for dispatch to thread execution logic 1550 via thread dispatcher 1531.

In some embodiments, graphics processor 1500 includes a display engine 1540. In some embodiments, display engine 1540 is external to processor 1500 and couples with the graphics processor via the ring interconnect 1502, or some other interconnect bus or fabric. In some embodiments, display engine 1540 includes a 2 D engine 1541 and a display controller 1543. In some embodiments, display engine 1540 contains special purpose logic capable of operating independently of the 3D pipeline. In some embodiments, display controller 1543 couples with a display device (not shown), which may be a system integrated display device, as in a laptop computer, or an external display device attached via a display device connector.

In some embodiments, graphics pipeline 1520 and media pipeline 1530 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 16A is a block diagram illustrating a graphics processor command format 1600 according to some embodiments. FIG. 16B is a block diagram illustrating a graphics processor command sequence 1610 according to an embodiment. The solid lined boxes in FIG. 16A illustrate the components that are generally included in a graphics command while the dashed lines include components that are optional or that are only included in a sub-set of the graphics commands. The exemplary graphics processor command format 1600 of FIG. 16A includes data fields to identify a target client 1602 of the command, a command operation code (opcode) 1604, and the relevant data 1606 for the command. A sub-opcode 1605 and a command size 1608 are also included in some commands.

In some embodiments, client 1602 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2 D unit, a 3D unit, and a media unit. Each client unit has a corresponding processing pipeline that processes the commands. Once the command is received by the client unit, the client unit reads the opcode 1604 and, if present, sub-opcode 1605 to determine the operation to perform. The client unit performs the command using information in data field 1606. For some commands an explicit command size 1608 is expected to specify the size of the command. In some embodiments, the command parser automatically determines the size of at least some of the commands based on the command opcode. In some embodiments commands are aligned via multiples of a double word.

The flow diagram in FIG. 16B shows an exemplary graphics processor command sequence 1610. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 1610 may begin with a pipeline flush command 1612 to cause any active graphics pipeline to complete the currently pending commands for the pipeline. In some embodiments, the 3D pipeline 1622 and the media pipeline 1624 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 1612 can be used for pipeline synchronization or before placing the graphics processor into a low power state.

In some embodiments, a pipeline select command 1613 is used when a command sequence requires the graphics processor to explicitly switch between pipelines. In some embodiments, a pipeline select command 1613 is required only once within an execution context before issuing pipeline commands unless the context is to issue commands for both pipelines. In some embodiments, a pipeline flush command is 1612 is required immediately before a pipeline switch via the pipeline select command 1613.

In some embodiments, a pipeline control command 1614 configures a graphics pipeline for operation and is used to program the 3D pipeline 1622 and the media pipeline 1624. In some embodiments, pipeline control command 1614 configures the pipeline state for the active pipeline. In one embodiment, the pipeline control command 1614 is used for pipeline synchronization and to clear data from one or more cache memories within the active pipeline before processing a batch of commands.

In some embodiments, return buffer state commands 1616 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 1616 includes selecting the size and number of return buffers to use for a set of pipeline operations.

The remaining commands in the command sequence differ based on the active pipeline for operations. Based on a pipeline determination 1620, the command sequence is tailored to the 3D pipeline 1622 beginning with the 3D pipeline state 1630 or the media pipeline 1624 beginning at the media pipeline state 1640.

The commands to configure the 3D pipeline state 1630 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 1630 commands are also able to selectively disable or bypass certain pipeline elements if those elements will not be used.

In some embodiments, 3D primitive 1632 command is used to submit 3D primitives to be processed by the 3D pipeline. Commands and associated parameters that are passed to the graphics processor via the 3D primitive 1632 command are forwarded to the vertex fetch function in the graphics pipeline. The vertex fetch function uses the 3D primitive 1632 command data to generate vertex data structures. The vertex data structures are stored in one or more return buffers. In some embodiments, 3D primitive 1632 command is used to perform vertex operations on 3D primitives via vertex shaders. To process vertex shaders, 3D pipeline 1622 dispatches shader execution threads to graphics processor execution units.

In some embodiments, 3D pipeline 1622 is triggered via an execute 1634 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 1610 follows the media pipeline 1624 path when performing media operations. In general, the specific use and manner of programming for the media pipeline 1624 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 1624 is configured in a similar manner as the 3D pipeline 1622. A set of commands to configure the media pipeline state 1640 are dispatched or placed into a command queue before the media object commands 1642. In some embodiments, media pipeline state commands 1640 include data to configure the media pipeline elements that will be used to process the media objects. This includes data to configure the video decode and video encode logic within the media pipeline, such as encode or decode format. In some embodiments, media pipeline state commands 1640 also support the use of one or more pointers to "indirect" state elements that contain a batch of state settings.

In some embodiments, media object commands 1642 supply pointers to media objects for processing by the media pipeline. The media objects include memory buffers containing video data to be processed. In some embodiments, all media pipeline states must be valid before issuing a media object command 1642. Once the pipeline state is configured and media object commands 1642 are queued, the media pipeline 1624 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 17:
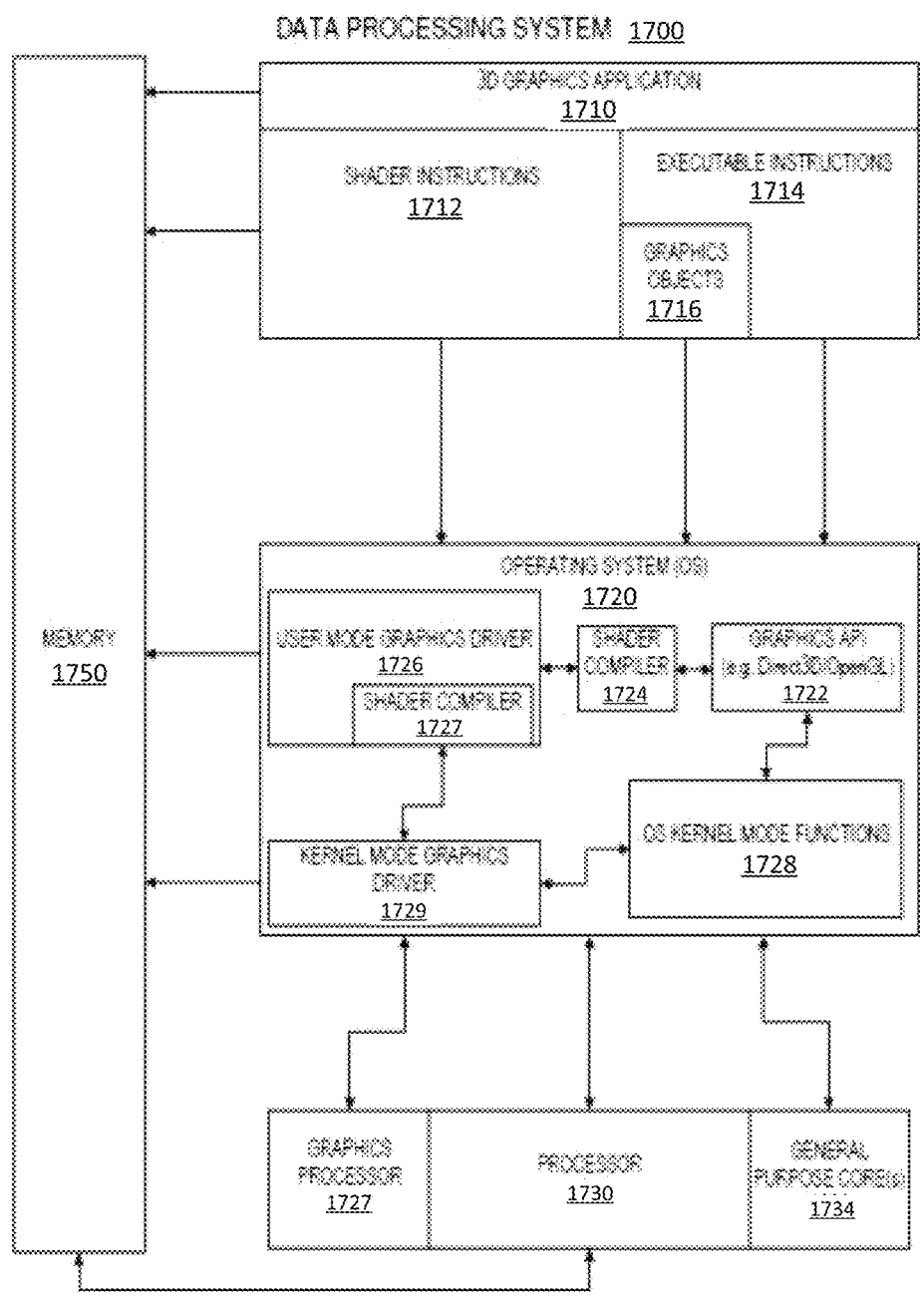
FIG. 17 illustrates exemplary graphics software architecture for a data processing system according to an embodiment.

FIG. 17 illustrates exemplary graphics software architecture for a data processing system 1700 according to some embodiments. In some embodiments, software architecture includes a 3D graphics application 1710, an operating system 1720, and at least one processor 1730. In some embodiments, processor 1730 includes a graphics processor 1732 and one or more general-purpose processor core(s) 1734. The graphics application 1710 and operating system 1720 each execute in the system memory 1750 of the data processing system.

In some embodiments, 3D graphics application 1710 contains one or more shader programs including shader instructions 1712. The shader language instructions may be in a high-level shader language, such as the High Level Shader Language (HLSL) or the OpenGL Shader Language (GLSL). The application also includes executable instructions 1714 in a machine language suitable for execution by the general-purpose processor core 1734. The application also includes graphics objects 1716 defined by vertex data.

In some embodiments, operating system 1720 is a Microsoft® Windows® operating system from the Microsoft Corporation, a proprietary UNIX-like operating system, or an open source UNIX-like operating system using a variant of the Linux kernel. The operating system 1720 can support a graphics API 1022 such as the Direct3D API, the OpenGL API, or the Vulkan API. When the Direct3D API is in use, the operating system 1720 uses a front-end shader compiler 1724 to compile any shader instructions 1712 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1710. In some embodiments, the shader instructions 1712 are provided in an intermediate form, such as a version of the Standard Portable Intermediate Representation (SPIR) used by the Vulkan API.

In some embodiments, user mode graphics driver 1726 contains a back-end shader compiler 1727 to convert the shader instructions 1712 into a hardware specific representation. When the OpenGL API is in use, shader instructions 1712 in the GLSL high-level language are passed to a user mode graphics driver 1726 for compilation. In some embodiments, user mode graphics driver 1726 uses operating system kernel mode functions 1728 to communicate with a kernel mode graphics driver 1729. In some embodiments, kernel mode graphics driver 1729 communicates with graphics processor 1732 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 18:
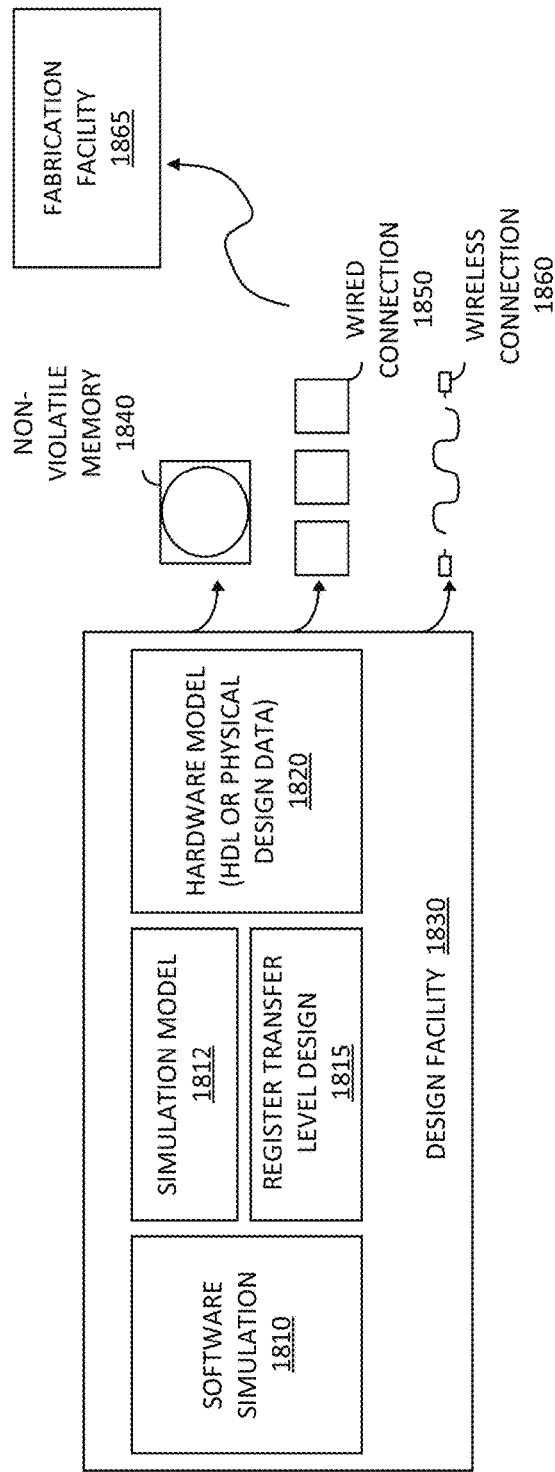
FIG. 18 is a block diagram illustrating an IP core development system that may be used to manufacture an integrated circuit to perform operations according to an embodiment.

FIG. 18 is a block diagram illustrating an IP core development 1800 that may be used to manufacture an integrated circuit to perform operations according to an embodiment. The IP core development system 1800 may be used to generate modular, re-usable designs that can be incorporated into a larger design or used to construct an entire integrated circuit (e.g., an SOC integrated circuit). A design facility 1830 can generate a software simulation 1810 of an IP core design in a high level programming language (e.g., C/C++). The software simulation 1810 can be used to design, test, and verify the behavior of the IP core using a simulation model 1812. The simulation model 1812 may include functional, behavioral, and/or timing simulations. A register transfer level (RTL) design can then be created or synthesized from the simulation model 1800. The RTL design 1815 is an abstraction of the behavior of the integrated circuit that models the flow of digital signals between hardware registers, including the associated logic performed using the modeled digital signals. In addition to an RTL design 1815, lower-level designs at the logic level or transistor level may also be created, designed, or synthesized. Thus, the particular details of the initial design and simulation may vary.

The RTL design 1815 or equivalent may be further synthesized by the design facility into a hardware model 1820, which may be in a hardware description language (HDL), or some other representation of physical design data. The HDL may be further simulated or tested to verify the IP core design. The IP core design can be stored for delivery to a 3$^{rd}$ party fabrication facility 1865 using non-volatile memory 1840 (e.g., hard disk, flash memory, or any non-volatile storage medium). Alternatively, the IP core design may be transmitted (e.g., via the Internet) over a wired connection 1850 or wireless connection 1860. The fabrication facility 1865 may then fabricate an integrated circuit that is based at least in part on the IP core design. The fabricated integrated circuit can be configured to perform operations in accordance with at least one embodiment described herein.

Exemplary System on a Chip Integrated Circuit

Figure 19:
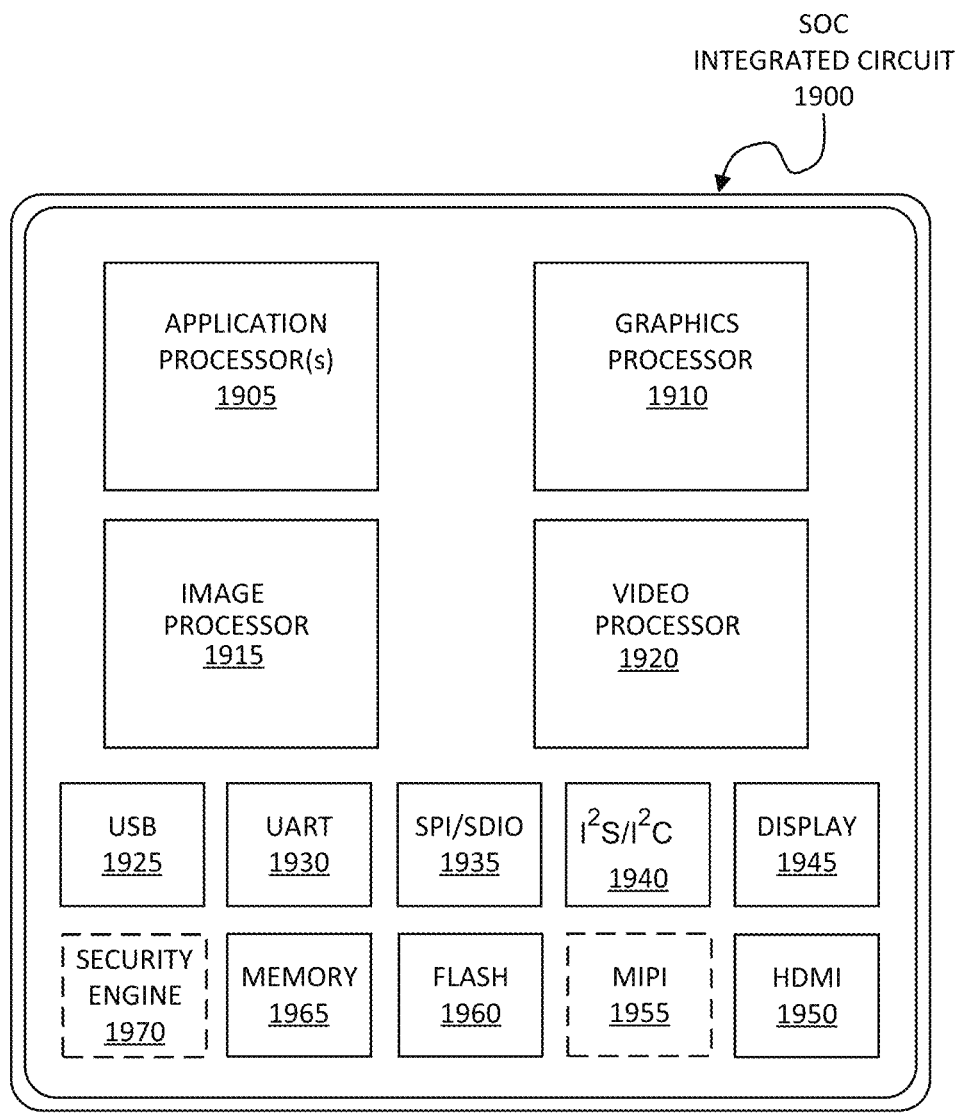
FIG. 19 is a block diagram illustrating an exemplary system on a chip integrated circuit that may be fabricated using one or more IP cores, according to an embodiment.
Figure 20:
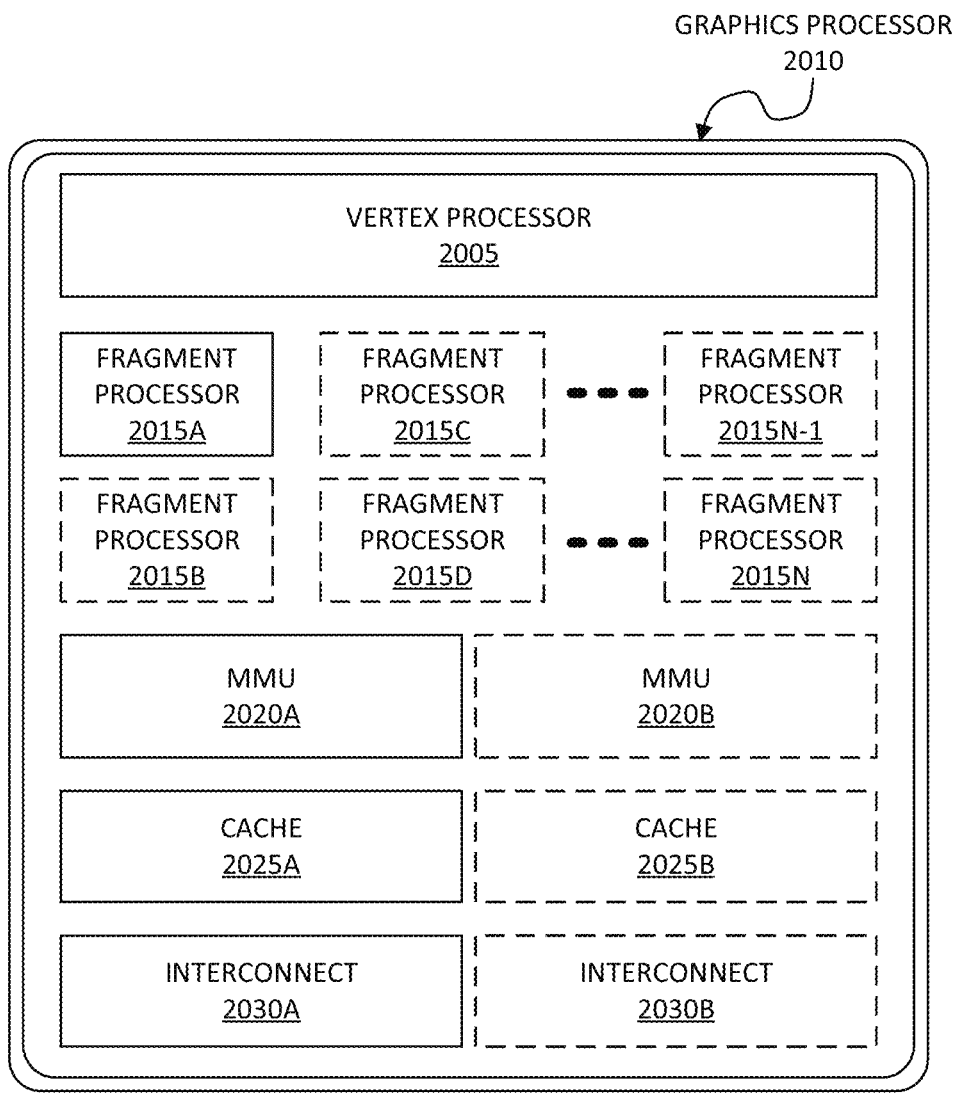
FIG. 20 is a block diagram illustrating an exemplary graphics processor of a system on a chip integrated circuit that may be fabricated using one or more IP cores, according to an embodiment.
Figure 21:
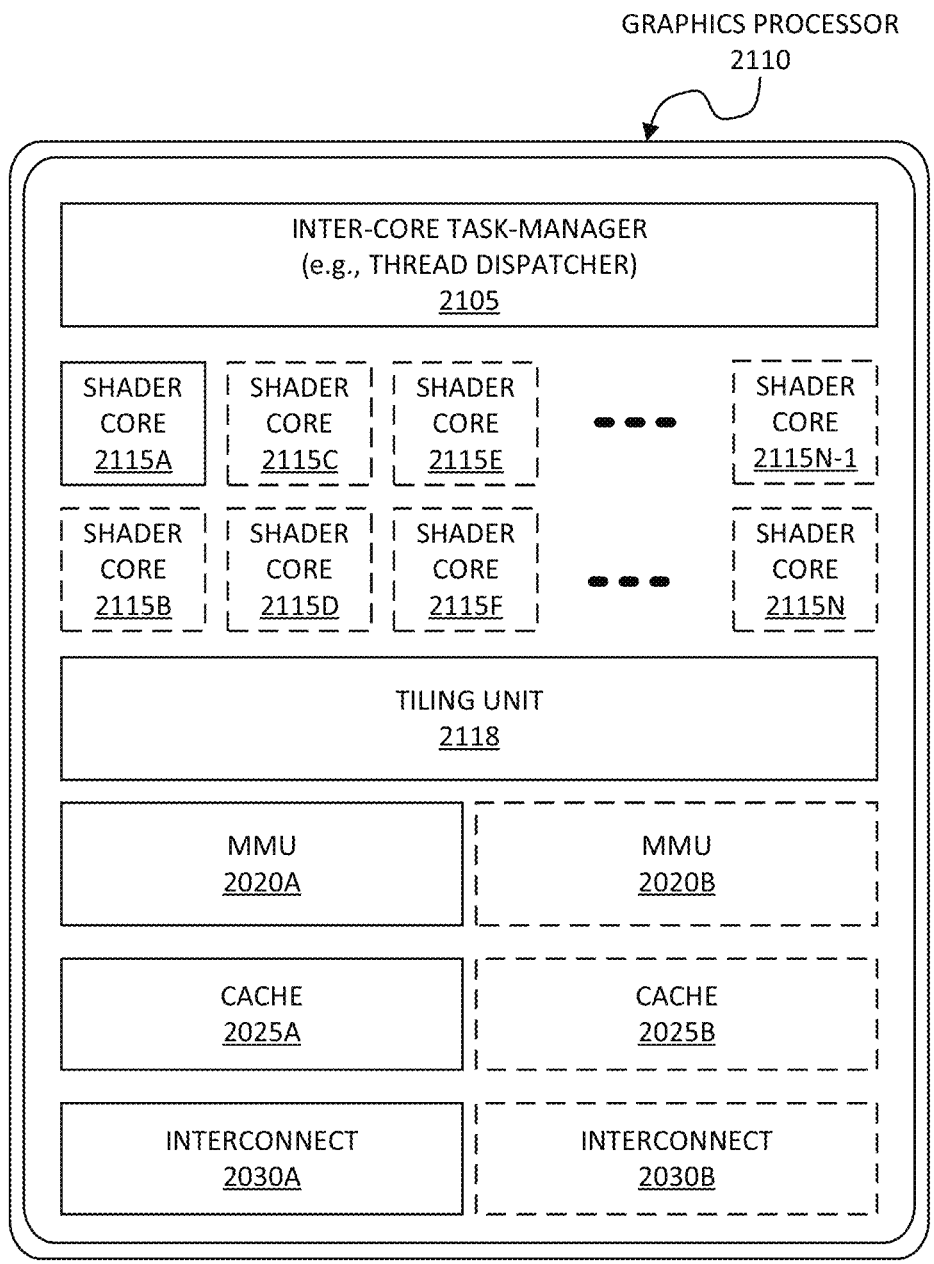
FIG. 21 is a block diagram illustrating an additional exemplary graphics processor of a system on a chip integrated circuit that may be fabricated using one or more IP cores, according to an embodiment.

FIGS. 19-21 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 19 is a block diagram illustrating an exemplary system on a chip integrated circuit 1900 that may be fabricated using one or more IP cores, according to an embodiment. Exemplary integrated circuit 1900 includes one or more application processor(s) 1905 (e.g., CPUs), at least one graphics processor 1910, and may additionally include an image processor 1915 and/or a video processor 1920, any of which may be a modular IP core from the same or multiple different design facilities. Integrated circuit 1900 includes peripheral or bus logic including a USB controller 1925, UART controller 1930, an SPI/SDIO controller 1935, and an I$^2$S/I$^2$C controller 1940. Additionally, the integrated circuit can include a display device 1945 coupled to one or more of a high-definition multimedia interface (HDMI) controller 1950 and a mobile industry processor interface (MIPI) display interface 1955. Storage may be provided by a flash memory subsystem 1960 including flash memory and a flash memory controller. Memory interface may be provided via a memory controller 1965 for access to SDRAM or SRAM memory devices. Some integrated circuits additionally include an embedded security engine 1970.

Additionally, other logic and circuits may be included in the processor of integrated circuit 1900, including additional graphics processors/cores, peripheral interface controllers, or general purpose processor cores.

FIG. 20 is a block diagram illustrating an exemplary graphics processor 2010 of a system on a chip integrated circuit that may be fabricated using one or more IP cores, according to an embodiment. Graphics processor 2010 can be a variant of the graphics processor 1910 of FIG. 19. Graphics processor 2010 includes a vertex processor 2005 and one or more fragment processor(s) 2015A-2015N (e.g., 2015A, 2015B, 2015C, 2015D, through 2015N-1, and 2015N). Graphics processor 2010 can execute different shader programs via separate logic, such that the vertex processor 2005 is optimized to execute operations for vertex shader programs, while the one or more fragment processor(s) 2015A-2015N execute fragment (e.g., pixel) shading operations for fragment or pixel shader programs. The vertex processor 2005 performs the vertex processing stage of the 3D graphics pipeline and generates primitives and vertex data. The fragment processor(s) 2015A-2015N use the primitive and vertex data generated by the vertex processor 2005 to produce a framebuffer that is displayed on a display device. In one embodiment, the fragment processor(s) 2015A-2015N are optimized to execute fragment shader programs as provided for in the OpenGL API, which may be used to perform similar operations as a pixel shader program as provided for in the Direct 3D API.

Graphics processor 2010 additionally includes one or more memory management units (MMUs) 2020A-2020B, cache(s) 2025A-2025B, and circuit interconnect(s) 2030A-2030B. The one or more MMU(s) 2020A-2020B provide for virtual to physical address mapping for integrated circuit 2010, including for the vertex processor 2005 and/or fragment processor(s) 2015A-2015N, which may reference vertex or image/texture data stored in memory, in addition to vertex or image/texture data stored in the one or more cache(s) 2025A-2025B. In one embodiment the one or more MMU(s) 2025A-2025B may be synchronized with other MMUs within the system, including one or more MMUs associated with the one or more application processor(s) 1405, image processor 1915, and/or video processor 1920 of FIG. 19, such that each processor 1905-1920 can participate in a shared or unified virtual memory system. The one or more circuit interconnect(s) 2030A-2030B enable graphics processor 2010 to interface with other IP cores within the SoC, either via an internal bus of the SoC or via a direct connection, according to embodiments.

FIG. 21 is a block diagram illustrating an additional exemplary graphics processor 2110 of a system on a chip integrated circuit that may be fabricated using one or more IP cores, according to an embodiment. Graphics processor 2110 can be a variant of the graphics processor 1910 of FIG. 19. Graphics processor 2110 includes the one or more MMU(s) 2020A-2020B, caches 2025A-2025B, and circuit interconnects 2030A-2030B of the integrated circuit 2000 of FIG. 20.

Graphics processor 2110 includes one or more shader core(s) 2115A-2115N (e.g., 2115A, 2115B, 2115C, 2115D, 2115E, 2115F, through 2015N-1, and 2015N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 2110 includes an inter-core task manager 2105, which acts as a thread dispatcher to dispatch execution threads to one or more shader cores 2115A-2115N and a tiling unit 2118 to accelerate tiling operations for tile-based rendering, in which rendering operations for a scene are subdivided in image space, for example to exploit local spatial coherence within a scene or to optimize use of internal caches.

Additional and Alternative Implementation Notes

In the above description of example implementations, for purposes of explanation, specific numbers, materials configurations, and other details are set forth to explain better the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and computer-readable instructions as indicated by the context described herein.

As used in this application, the term "or" is intended to mean an inclusive "or" rather than an exclusive "or." That is unless specified otherwise or clear from context, "X employs A or B" is intended to mean any of the natural inclusive permutations. That is if X employs A; X employs B; or X employs both A and B, then "X employs A or B" is satisfied under any of the preceding instances. Also, the articles "an" and "an" as used in this application and the appended claims should be construed to mean "one or more," unless specified otherwise or clear from context to be directed to a singular form.

These processes are illustrated as a collection of blocks in a logical flow graph, which represents a sequence of operations that can be implemented in mechanics alone or a combination of hardware, software, and firmware. In the context of software/firmware, the blocks represent instructions stored on one or more computer-readable storage media that, when executed by one or more processors, perform the recited operations.

Note that the order in which the processes are described is not intended to be construed as a limitation and any number of the described process blocks can be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

In the claims appended herein, the inventor invokes 35 U.S.C. § 112(f) or paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. 112(f) or paragraph 6.

To the extent various operations or functions are described herein, they can be described or defined as hardware circuitry, software code, instructions, configuration, and/or data. The content can be embodied in hardware logic, or as directly executable software ("object" or "executable" form), source code, high-level shader code designed for execution on a graphics engine, or low-level assembly language code in an instruction set for a specific processor or graphics core. The software content of the embodiments described herein can be provided via an article of manufacture with the content stored thereon, or via a method of operating a communication interface to send data via the communication interface.

A non-transitory machine-readable storage medium can cause a machine to perform the functions or operations described, and includes any mechanism that stores information in a form accessible by a machine (e.g., computing device, electronic system, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The following examples pertain to further embodiments:

Example 1 is a graphics processing unit (GPU), the GPU comprising: one or more graphics cores configured to process computer graphics, the one or more graphics cores being further configured to operate with a memory; the one or more graphics cores further configured to: receive an access request to a memory resource that is associated with a metadata stored in the memory, the metadata being configured to encode a null-state indicator value that indicates whether the associated memory resource is null; read the null-state indicator value of the associated metadata; determine that the null-state indicator value indicates that the associated memory resource is null; in response to the null-state determination and the access request being a write operation, ignore the access request.

In Example 2: A GPU as recited in Example 1, wherein the one or more graphics cores further configured to: in response to the null-state determination and the access requesting being a read operation, return a default value instead of reading the memory resource.

In Example 3: A GPU as recited in Example 1, wherein the memory resource is a cache and the access-request ignorance includes marking a cacheline of the cache as null.

In Example 4: A GPU as recited in Example 1, wherein the memory resource is a cache and the access-request ignorance includes marking a cacheline of the cache as null and the access request is a write request, the one or more graphics cores further configured to: perform a null-state read on the memory resource that returns an indication that the memory resource contains one or more null addresses; in response to the read returning the indication that the memory resource contains one or more null addresses, store a default value in a cacheline and set a state in a cache that prevents writes to that cacheline.

In Example 5: A GPU as recited in Example 1, wherein the default value is a defined value that is indicative of a null state.

In Example 6: A GPU as recited in Example 1, wherein the default value is zero.

In Example 7: A GPU as recited in Example 1, wherein: the metadata being configured to have a size of M bits per compression block and the memory resource is configured to have N bytes per compression block; the metadata being configured to the encoded value that indicates ($2^M-1$) possible different compression states.

In Example 8: A GPU as recited in Example 1, wherein the one or more graphics cores further configured to: in response to the null determination and the access request being a fast clear operation, ignore the access request.

In Example 9: A GPU as recited in Example 1, wherein the one or more graphics cores further configured to: set the null-encoding value of the metadata to indicate that the associated memory resource is in a null state, the setting being in response to an initialization of the memory resources or the memory resource being unmapped from memory.

In Example 10: A GPU as recited in Example 1, wherein the one or more graphics cores further configured to: set the null-encoding value of the metadata to indicate that the associated memory resource is in a non-null state, the setting being in response to the memory resource being mapped to memory.

In Example 11: A GPU as recited in Example 1, wherein the memory is part of the GPU.

In Example 12: A graphics processing unit (GPU), the GPU comprising: one or more graphics cores configured to process computer graphics, the one or more graphics cores being further configured to operate with a memory; the one or more graphics cores further configured to: receive an access request to a memory resource; determine that the data of the memory resource is in a null state by accessing an address translation table associated with the memory resource and doing so without a read operation of the memory resource in response to the null state determination and the access requesting being a read operation, return a default value instead of reading the memory resource.

In Example 13: A GPU as recited in Example 12, wherein the memory is part of the GPU.

In Example 14: A GPU as recited in Example 12, wherein the memory resource is a cache.

In Example 15: A GPU as recited in Example 12, wherein the one or more graphics cores further configured to: in response to the null determination and the access request being a write operation, ignore the access request.

In Example 16: A GPU as recited in Example 12, wherein the default value is a defined value that is indicative of a null state.

In Example 17: A GPU as recited in Example 12, wherein the default value is zero.

In Example 18: A graphics processing unit (GPU), the GPU comprising: one or more graphics cores configured to process computer graphics, the one or more graphics cores being further configured to operate with a memory; the one or more graphics cores further configured to: receive an access request to a memory resource that is associated with a metadata stored in the memory, the metadata being configured to store an encoded value that indicates one of multiple compression states of data stored in the memory resource; read encoded value of the metadata; determine compression state of the data stored in the memory resource based upon the read encoded value of the metadata; decompress the data stored in the memory resource based on the determined compression state, wherein at least one of the encoded values of the metadata specifies a null-encoding value that indicates whether the associated memory resource is null; read the null-encoding value of the associated metadata; determine that the null-encoding value indicates that the associated memory resource is null; in response to the null determination and the access request being a fast clear operation, ignore the access request.

In Example 19: A GPU as recited, wherein the memory is part of the GPU.

In Example 20: A GPU as recited, wherein the memory resource is a cache.

In Example 21: A graphics processing unit (GPU), the GPU comprising: one or more graphics cores configured to process computer graphics, the one or more graphics cores being further configured to operate with a memory; the one or more graphics cores further configured to: receive an access request to a memory resource that is associated with a metadata stored in the memory, the metadata being configured to store an encoded value that indicates one of multiple states of data stored in the memory resource; the metadata being configured to include two or more sets of M-bits and the memory resource having two or more sets of N bytes, each set of M-bits of the metadata being associated with one of the sets of the N bytes of the memory resource, wherein the metadata has multiple possible encodings, one of the multiple possible encoding indicates a null state of the associated memory resource; read encoded value of the metadata; determine whether two sets of M-bits of the metadata have a value that indicates a null state; in response to a determination that two sets of M-bits of the metadata have a value that indicates a null state, identify the associated sets of N-bytes of the memory resource to be in a null state; in response to a determination that neither of two sets of M-bits of the metadata have a value that indicates a null state, identify a compression state of the associated sets of N-bytes of the memory resource; decompress the associated sets of N-bytes of the memory resource in accordance with the identified compression state; in response to a determination that only one of two sets of M-bits of the metadata have a value that indicates a null state, decompressing the associated sets of N-bytes of the memory resource.

In Example 22: A GPU as recited, wherein the memory is part of the GPU.

In Example 23: A GPU as recited, wherein the memory resource is a cache.

In Example 24: A graphics processing unit (GPU), the GPU comprising: one or more graphics cores configured to process computer graphics, the one or more graphics cores being further configured to operate with a memory; the one or more graphics cores further configured to: receive a rendering request for a memory resource that is associated with a metadata stored in the memory, the metadata is configured to encode a fast-clear indicator value that indicates whether the associated memory resource is null; determine that the memory resource is set to clear color; in response to the determinations, set the metadata to indicate the fast-clear state.

In Example 25: A GPU as recited, wherein the memory is part of the GPU.

In Example 26: A GPU as recited, wherein the memory resource is a cache.

In Example 27: A graphics processing unit (GPU), the GPU comprising: one or more graphics cores configured to process computer graphics, the one or more graphics cores being further configured to operate with a memory; the one or more graphics cores further configured to: receive a write request to a memory resource; perform a null-state read on that memory resource that returns an indication that the memory resource contains one or more null addresses; in response to the read returning the indication that the memory resource contains one or more null addresses, store a default value in a cacheline and set a state in a cache that prevents writes to that cacheline.

In Example 28: A GPU as recited, wherein the one or more graphics cores further configured to: determine that the memory resource is enabled to include one or more null addresses; performing the null-state read in response to the determination of null-address enablement.

In Example 29: A GPU as recited, wherein the cache is a write-back cache that employs allocate-on-write to consolidate writes to a common cacheline.

In Example 30: A GPU as recited, wherein the memory is part of the GPU.

In Example 31: A GPU as recited, wherein the memory resource is a cache.

In Example 32: A graphics processing unit (GPU), the GPU comprising: one or more graphics cores configured to process computer graphics, the one or more graphics cores being further configured to operate with a memory; the one or more graphics cores further configured to: for each memory unit (MU) of multiple MUs of a memory resource: determine compression size for data stored in the multiple memory units (MUs) of a memory resource using each available compression rate available; determine memory bandwidth for accessing a single byte of the memory resource; based on the determinations, find encodings for each memory unit (MU) that produce best compression rate and that produce the least wasted memory bandwidth for accessing a single byte of a compression block; find encodings for each pair of MUs that produce best compression rate and that produce least wasted memory bandwidth for accessing a single byte of the compression block; recursively repeat the encoding finding for each pair of MUs until a specified maximum block size is reached; discard encodings that are worse than another encoding in both compression rate and wasted memory bandwidth; select one of the remaining encodings based on a decision about the relative priority of compression rate and wasted memory bandwidth; identify the best compression encoding.

In Example 33: A GPU as recited, wherein the memory is part of the GPU.

In Example 34: A GPU as recited, wherein the memory resource is a cache.

In Example 35: One or more computer-readable media storing instructions thereon that, when executed by one or more processors, direct the one or more processors to perform operations comprising: receiving an access request to a memory resource that is associated with a metadata stored in a memory, the metadata being configured to encode a null-state indicator value that indicates whether the associated memory resource is null; reading the null-state indicator value of the associated metadata; determining that the null-state indicator value indicates that the associated memory resource is null; in response to the null-state determination and the access request being a write operation, ignoring the access request.

In Example 36: One or more computer-readable media of Example 35, wherein the operations further comprise: in response to the null-state determination and the access requesting being a read operation, returning a default value instead of reading the memory resource.

In Example 37: One or more computer-readable media of Example 35, wherein the memory resource is a cache and the access-request ignorance includes marking a cacheline of the cache as null.

In Example 38: One or more computer-readable media of Example 35, wherein the memory resource is a cache and the access-request ignorance includes marking a cacheline of the cache as null and the access request is a write request, the operations further comprise: performing a null-state read on the memory resource that returns an indication that the memory resource contains one or more null addresses; in response to the read returning the indication that the memory resource contains one or more null addresses, storing a default value in a cacheline and set a state in a cache that prevents writes to that cacheline.

In Example 39: One or more computer-readable media of Example 35, wherein the default value is a defined value that is indicative of a null state.

In Example 40: One or more computer-readable media of Example 35, wherein the default value is zero.

In Example 41: One or more computer-readable media of Example 35, wherein: the metadata being configured to have a size of M bits per compression block and the memory resource is configured to have N bytes per compression block; the metadata being configured to the encoded value that indicates ($2^M-1$) possible different compression states.

In Example 42: One or more computer-readable media of Example 35, wherein the operations further comprise: in response to the null determination and the access request being a fast clear operation, ignoring the access request.

In Example 43: One or more computer-readable media of Example 35, wherein the operations further comprise: setting the null-encoding value of the metadata to indicate that the associated memory resource is in a null state, the setting being in response to an initialization of the memory resources or the memory resource being unmapped from memory.

In Example 44: One or more computer-readable media of Example 35, wherein the operations further comprise: setting the null-encoding value of the metadata to indicate that the associated memory resource is in a non-null state, the setting being in response to the memory resource being mapped to memory.

In Example 45: One or more computer-readable media storing instructions thereon that, when executed by one or more processors, direct the one or more processors to perform operations comprising: receiving an access request to a memory resource; determining that the data of the memory resource is in a null state by accessing an address translation table associated with the memory resource and doing so without a read operation of the memory resource; in response to the null state determination and the access requesting being a read operation, returning a default value instead of reading the memory resource.

In Example 46: One or more computer-readable media of Example 45, wherein the operations further comprise: in response to the null determination and the access request being a write operation, ignoring the access request.

In Example 47: One or more computer-readable media of Example 45, wherein the default value is a defined value that is indicative of a null state.

In Example 48: One or more computer-readable media of Example 45, wherein the default value is zero.

In Example 49: One or more computer-readable media storing instructions thereon that, when executed by one or more processors, direct the one or more processors to perform operations comprising: receiving an access request to a memory resource that is associated with a metadata stored in a memory, the metadata being configured to store an encoded value that indicates one of multiple compression states of data stored in the memory resource; reading encoded value of the metadata; determining compression state of the data stored in the memory resource based upon the read encoded value of the metadata; decompressing the data stored in the memory resource based on the determined compression state, wherein at least one of the encoded values of the metadata specifies a null-encoding value that indicates whether the associated memory resource is null; reading the null-encoding value of the associated metadata; determining that the null-encoding value indicates that the associated memory resource is null; in response to the null determination and the access request being a fast clear operation, ignoring the access request.

In Example 50: One or more computer-readable media storing instructions thereon that, when executed by one or more processors, direct the one or more processors to perform operations comprising: receiving an access request to a memory resource that is associated with a metadata stored in a memory, the metadata being configured to store an encoded value that indicates one of multiple states of data stored in the memory resource; the metadata being configured to include two or more sets of M-bits and the memory resource having two or more sets of N bytes, each set of M-bits of the metadata being associated with one of the sets of the N bytes of the memory resource, wherein the metadata has multiple possible encodings, one of the multiple possible encoding indicates a null state of the associated memory resource; reading encoded value of the metadata; determining whether two sets of M-bits of the metadata have a value that indicates a null state; in response to a determination that two sets of M-bits of the metadata have a value that indicates a null state, identifying the associated sets of N-bytes of the memory resource to be in a null state; in response to a determination that neither of two sets of M-bits of the metadata have a value that indicates a null state, identifying a compression state of the associated sets of N-bytes of the memory resource; decompressing the associated sets of N-bytes of the memory resource in accordance with the identified compression state; in response to a determination that only one of two sets of M-bits of the metadata have a value that indicates a null state, decompressing the associated sets of N-bytes of the memory resource.

In Example 51: One or more computer-readable media storing instructions thereon that, when executed by one or more processors, direct the one or more processors to perform operations comprising: receiving a rendering request for a memory resource that is associated with a metadata stored in a memory, the metadata is configured to encode a fast-clear indicator value that indicates whether the associated memory resource is null; determining that the memory resource is set to clear color; in response to the determinations, setting the metadata to indicate the fast-clear state.

In Example 52: One or more computer-readable media storing instructions thereon that, when executed by one or more processors, direct the one or more processors to perform operations comprising: receiving a write request to a memory resource; performing a null-state read on that memory resource that returns an indication that the memory resource contains one or more null addresses; in response to the read returning the indication that the memory resource contains one or more null addresses, storing a default value in a cacheline and set a state in a cache that prevents writes to that cacheline.

In Example 53: One or more computer-readable media of Example 52, the operations further comprising: determining that the memory resource is enabled to include one or more null addresses; performing the null-state read in response to the determination of null-address enablement.

In Example 54: One or more computer-readable media of Example 52, wherein the cache is a write-back cache that employs allocate-on-write to consolidate writes to a common cacheline.

In Example 55: One or more computer-readable media storing instructions thereon that, when executed by one or more processors, direct the one or more processors to perform operations comprising: for each memory unit (MU) of multiple MUs of a memory resource: determining compression size for data stored in the multiple memory units (MUs) of a memory resource using each available compression rate available; determining memory bandwidth for accessing a single byte of the memory resource; based on the determinations, finding encodings for each memory unit (MU) that produce best compression rate and that produce the least wasted memory bandwidth for accessing a single byte of a compression block; finding encodings for each pair of MUs that produce best compression rate and that produce least wasted memory bandwidth for accessing a single byte of the compression block; recursively repeating the encoding finding for each pair of MUs until a specified maximum block size is reached; discarding encodings that are worse than another encoding in both compression rate and wasted memory bandwidth; selecting one of the remaining encodings based on a decision about the relative priority of compression rate and wasted memory bandwidth; identifying the best compression encoding.

In Example 56: A computer graphics system comprising: a receiver configured to receive an access request to a memory resource that is associated with a metadata stored in the memory, the metadata being configured to encode a null-state indicator value that indicates whether the associated memory resource is null; a reader configured to read the null-state indicator value of the associated metadata; a state-determiner configured to determine that the null-state indicator value indicates that the associated memory resource is null; a request director configured to, in response to the null-state determination and the access request being a write operation, direct the computer graphics system to ignore the access request.

In Example 57: A computer graphics system of Example 56, wherein: the request director being further configured to, in response to the null-state determination and the access requesting being a read operation, return a default value instead of reading the memory resource.

In Example 58: A computer graphics system of Example 56, wherein the memory resource is a cache and the access-request ignorance includes marking a cacheline of the cache as null.

In Example 59: A computer graphics system of Example 56, wherein the memory resource is a cache and the access-request ignorance includes marking a cacheline of the cache as null and the access request is a write request, and the reader being further configured to perform a null-state read on the memory resource that returns an indication that the memory resource contains one or more null addresses; the request director being further configured to, in response to the read returning the indication that the memory resource contains one or more null addresses, store a default value in a cacheline and set a state in a cache that prevents writes to that cacheline.

In Example 60: A computer graphics system of Example 56, wherein the default value is a defined value that is indicative of a null state.

In Example 61: A computer graphics system of Example 56, wherein the default value is zero.

In Example 62: A computer graphics system of Example 56, wherein: the metadata being configured to have a size of M bits per compression block and the memory resource is configured to have N bytes per compression block; the metadata being configured to the encoded value that indicates ($2^M-1$) possible different compression states.

In Example 63: A computer graphics system of Example 56, wherein: the request director being further configured to, in response to the null determination and the access request being a fast clear operation, directing the system to ignore the access request.

In Example 65: A computer graphics system of Example 56, wherein: a setter being configured to set the null-encoding value of the metadata to indicate that the associated memory resource is in a null state, the setting being in response to an initialization of the memory resources or the memory resource being unmapped from memory.

In Example 66: A computer graphics system of Example 56, wherein: a setter being configured to set the null-encoding value of the metadata to indicate that the associated memory resource is in a non-null state, the setting being in response to the memory resource being mapped to memory.

In Example 67: A computer graphics system comprising: a receiver configured to receive an access request to a memory resource; a state determiner configured to determine that the data of the memory resource is in a null state by accessing an address translation table associated with the memory resource and doing so without a read operation of the memory resource a request director configured to, in response to the null state determination and the access requesting being a read operation, return a default value instead of reading the memory resource.

In Example 68: A computer graphics system of Example 66, wherein: the request director configured to, in response to the null determination and the access request being a write operation, directing the system to ignore the access request.

In Example 69: A computer graphics system of Example 66, wherein the default value is a defined value that is indicative of a null state.

In Example 70: A computer graphics system of Example 66, wherein the default value is zero.

In Example 71: A computer graphics system comprising: a receiver configured to receive an access request to a memory resource that is associated with a metadata stored in the memory, the metadata being configured to store an encoded value that indicates one of multiple compression states of data stored in the memory resource; a reader configured to read encoded value of the metadata; a state determiner configured to determine compression state of the data stored in the memory resource based upon the read encoded value of the metadata; a decompressor configured to decompress the data stored in the memory resource based on the determined compression state, wherein at least one of the encoded values of the metadata specifies a null-encoding value that indicates whether the associated memory resource is null; the reader further configured to read the null-encoding value of the associated metadata; the decompressor further configured determine that the null-encoding value indicates that the associated memory resource is null; a request director configured to, in response to the null determination and the access request being a fast clear operation, directing the system to ignore the access request.

In Example 72: A computer graphics system comprising: a receiver configured to receive a rendering request for a memory resource that is associated with a metadata stored in the memory, the metadata is configured to encode a fast-clear indicator value that indicates whether the associated memory resource is null; a state determiner configured to determine that the memory resource is set to clear color; a setter configured to, in response to the determinations, set the metadata to indicate the fast-clear state.

What is claimed is:

1. A graphics processor comprising:
   a memory; and
   one or more graphics cores configured to operate with the memory to process computer graphics by:
      receiving an access request to a memory resource that is associated with a metadata stored in the memory, the metadata being configured to encode, as a number of bits per respective compression block, state data identifying (i) when the associated memory resource is null, a null-state indicator value so indicating, and (ii) when the associated memory resource is not null, a compression state of the respective compression block from among possible different compression states;
      determining whether the state data encodes the null-state indicator value indicating that the associated memory resource is null before accessing the memory resource; and
      in response to (i) the null-state determination, and (ii) the access request being a write operation, ignoring the access request.

2. The graphics processor as recited in claim 1, wherein the one or more graphics cores are configured to, in response to (i) the null-state determination and (ii) the access request being a read operation, return a default value as a response to the access request.

3. The graphics processor as recited in claim 1, wherein the memory resource is a cache, and the ignoring of the access request includes marking a cacheline of the cache as null.

4. The graphics processor as recited in claim 1, wherein:
   the memory resource is a cache,
   the ignoring of the access request includes marking a cacheline of the cache as null,
   the access request is a write request, and
   the one or more graphics cores are configured to:
      read a null-state on the memory resource; and
      in response to reading of the null-state, (i) returning an indication that the memory resource contains one or more null addresses, (ii) storing a default value in a cacheline, and (iii) setting a state in a cache that prevents writes to the cacheline.

5. The graphics processor as recited in claim 4, wherein the default value is a defined value that is indicative of a null state.

6. The graphics processor as recited in claim 4, wherein the default value is zero.

7. The graphics processor as recited in claim 1, wherein the number of bits of state data per respective compression block encoded as the metadata is M bits per compression block and indicates a compression state from among $(2^M-1)$ possible different compression states.

8. The graphics processor as recited in claim 1, wherein the one or more graphics cores are configured to, in response to the null determination and the access request being a fast clear operation, ignore the access request.

9. The graphics processor as recited in claim 1, wherein the one or more graphics cores are configured to set the null-state indicator value of the metadata to indicate that the associated memory resource is null in response to (i) an initialization of the memory resource or (ii) the memory resource being unmapped from memory.

10. The graphics processor as recited in claim 1, wherein the one or more graphics cores are configured to set the null-state indicator value of the metadata to indicate that the associated memory resource is not null in response to the memory resource being mapped to memory.

11. A graphics processor comprising:
    a memory; and
    one or more graphics cores configured to operate with the memory to process computer graphics by:
       receiving an access request to a memory resource that is associated with a metadata stored in the memory, the metadata being configured to encode, as a number of bits per respective compression block, state data identifying (i) when the associated memory resource is null, a null-state indicator value so indicating, and (ii) when the associated memory resource is not null, a compression state of the respective compression block from among possible different compression states;

determining whether the data of the memory resource is in a null state by accessing the state data associated with the memory resource without performing a read operation of the memory resource;

in response to (i) the null state determination, and (ii) the access request being a read operation, returning a default value in response to the access request instead of reading the memory resource; and receiving another access request to the memory resource that is a write operation and, in response to (i) the null state determination, and (ii) the another access request being a write operation, ignoring the write operation access request.

12. The graphics processor as recited in claim 11, wherein the memory resource is a cache.

13. The graphics processor as recited in claim 11, wherein the default value is a defined value that is indicative of the null state.

14. The graphics processor as recited in claim 11, wherein the default value is zero.

15. The graphics processor of claim 1, wherein the possible different compression states associated with the respective compression block is based upon the number of bits encoded by the metadata.

16. The graphics processor of claim 1, wherein the metadata is hierarchical.

17. A non-transitory computer-readable medium having instructions stored thereon that, when executed by one of more processors, cause the one or more processors to:

receive an access request to a memory resource that is associated with a metadata stored in a memory, the metadata being configured to encode, as a number of bits per respective compression block, state data identifying (i) when the associated memory resource is null, a null-state indicator value so indicating, and (ii) when the associated memory resource is not null, a compression state of the respective compression block from among possible different compression states;

determine whether the data of the memory resource is in a null state by accessing the state data associated with the memory resource without performing a read operation of the memory resource; and in response to (i) the null state determination, and (ii) the access request being a write operation, ignoring the access request.

18. The non-transitory computer-readable medium of claim 17, further including instructions that, when executed by the one of more processors, cause the one or more processors to:

receive another access request to the memory resource that is a read operation, and returning a default value as a response to the access request instead of reading the memory resource.

19. The non-transitory computer-readable medium of claim 17, wherein the default value is a defined value that is indicative of the null state.

* * * * *